United States Patent
Al Suwailem et al.

(10) Patent No.: US 12,548,031 B2
(45) Date of Patent: Feb. 10, 2026

(54) METHOD AND SYSTEM FOR TRANSACTION VALIDATION IN A DISTRIBUTED COMPUTING SYSTEM

(71) Applicant: ISLAMIC DEVELOPMENT BANK INSTITUTE, Jeddah (SA)

(72) Inventors: Sami Al Suwailem, Jeddah (SA); Hilal Houssain, Jeddah (SA); Anis Ben Khedher, Jeddah (SA)

(73) Assignee: ISLAMIC DEVELOPMENT BANK INSTITUTE, Jeddah (SA)

( * ) Notice: Subject to any disclaimer, the term of this patent is extended or adjusted under 35 U.S.C. 154(b) by 312 days.

(21) Appl. No.: 17/600,401

(22) PCT Filed: Nov. 30, 2020

(86) PCT No.: PCT/IB2020/061255
§ 371 (c)(1),
(2) Date: Sep. 30, 2021

(87) PCT Pub. No.: WO2021/130576
PCT Pub. Date: Jul. 1, 2021

(65) Prior Publication Data
US 2022/0215390 A1 Jul. 7, 2022

(30) Foreign Application Priority Data
Dec. 23, 2019 (SG) .................. 10201912999V

(51) Int. Cl.
*G06Q 20/40* (2012.01)
(52) U.S. Cl.
CPC ....... *G06Q 20/405* (2013.01); *G06Q 20/4014* (2013.01); *G06Q 20/407* (2013.01)
(58) Field of Classification Search
None
See application file for complete search history.

(56) References Cited

U.S. PATENT DOCUMENTS 7,356,696 B1 4/2008 Jakobsson et al.
8,078,515 B2 * 12/2011 John .................. G06Q 30/0601
726/1

(Continued)

FOREIGN PATENT DOCUMENTS

AU 2018100482 A4 * 6/2018
CA 3222069 A1 * 6/2024 ......... G06Q 20/3552

(Continued)

OTHER PUBLICATIONS

D. Patel, Y. Panchal, R. Wankadia and K. Samdani, "A Study of Blockchain's Architecture and it's Applications," 2018 IEEE Punecon, Pune, India. https://ieeexplore.ieee.org/document/8745381?source=IQplus (Year: 2018).*

(Continued)

*Primary Examiner* — El Mehdi Oussir
(74) *Attorney, Agent, or Firm* — Brooks Kushman P.C.

(57) ABSTRACT

A method and system for transaction validation in a distributed computing system, the method including: associating first and second parameters with respective users of the distributed computing system, the first parameter being determined based on an increment for each validation performed by a respective user and a decrement for each transaction validation performed by the respective user, the second parameter being determined based on a transaction history and a validation history of the respective users; and associating respective validation priorities in respect of performing a validation task with members of a first set of validating users having at least one of the validating users other than the first of the users, the respective validation priorities being determined based on the first and second parameters associated with the members of the first set of validating users, the validation task comprising validation of the transaction.

13 Claims, 4 Drawing Sheets

(56) References Cited

U.S. PATENT DOCUMENTS

| | | | |
|---|---|---|---|
| 8,412,952 B1 | 4/2013 | Ramzan et al. | |
| 8,423,466 B2 * | 4/2013 | Lanc | G06Q 20/4014 705/35 |
| 10,373,158 B1 * | 8/2019 | James | G06Q 40/04 |
| 10,540,654 B1 * | 1/2020 | James | G06Q 20/223 |
| 10,915,891 B1 * | 2/2021 | Winklevoss | H04L 9/3255 |
| 11,164,251 B1 * | 11/2021 | Skala | G06Q 20/065 |
| 11,188,907 B1 * | 11/2021 | Vijayvergia | G06Q 20/023 |
| 11,200,569 B1 * | 12/2021 | James | G06Q 20/381 |
| 11,240,301 B2 * | 2/2022 | Kaddoura | A61F 2/447 |
| 11,308,487 B1 * | 4/2022 | Foster | G06Q 20/3829 |
| 11,314,722 B2 * | 4/2022 | Pierce | G06F 16/2379 |
| 11,334,883 B1 * | 5/2022 | Auerbach | G06Q 20/223 |
| 11,405,189 B1 * | 8/2022 | Bennison | H04L 9/0656 |
| 11,475,442 B1 * | 10/2022 | James | G06Q 20/3829 |
| 11,501,370 B1 * | 11/2022 | Paya | G06Q 20/3676 |
| 11,522,700 B1 * | 12/2022 | Auerbach | H04L 9/3213 |
| 11,564,266 B1 * | 1/2023 | Kahn | H04W 4/24 |
| 11,710,107 B2 * | 7/2023 | Mathew | G06Q 20/381 705/39 |
| 11,880,349 B2 * | 1/2024 | Padmanabhan | H04L 9/3239 |
| 11,909,860 B1 * | 2/2024 | So | G06Q 20/401 |
| 11,991,284 B1 * | 5/2024 | Ghabel | G06K 19/06037 |
| 12,147,989 B1 * | 11/2024 | Reis | G06Q 20/20 |
| 2013/0132854 A1 * | 5/2013 | Raleigh | G06F 3/0482 715/738 |
| 2017/0046669 A1 * | 2/2017 | Chow | G06Q 10/0631 |
| 2017/0201850 A1 * | 7/2017 | Raleigh | H04W 4/50 |
| 2017/0344988 A1 * | 11/2017 | Cusden | G06F 21/00 |
| 2018/0039667 A1 * | 2/2018 | Pierce | H04L 9/3247 |
| 2018/0276666 A1 * | 9/2018 | Haldenby | H04L 9/3268 |
| 2018/0293573 A1 * | 10/2018 | Ortiz | G06Q 20/20 |
| 2019/0043138 A1 * | 2/2019 | Blake | G06Q 20/102 |
| 2019/0044734 A1 * | 2/2019 | Lancashire | H04L 9/3239 |
| 2019/0116051 A1 * | 4/2019 | Rome | H04L 63/083 |
| 2019/0147431 A1 * | 5/2019 | Galebach | H04L 9/3247 705/44 |
| 2019/0182048 A1 * | 6/2019 | Lancashire | G06Q 20/223 |
| 2019/0236598 A1 * | 8/2019 | Padmanabhan | G06Q 20/389 |
| 2019/0287107 A1 * | 9/2019 | Gaur | G06Q 20/065 |
| 2019/0349426 A1 | 11/2019 | Smith et al. | |
| 2019/0356641 A1 * | 11/2019 | Isaacson | H04L 9/3231 |
| 2019/0372779 A1 * | 12/2019 | Monica | H04L 9/0637 |
| 2019/0386817 A1 * | 12/2019 | Carson | H04L 9/0643 |
| 2020/0007322 A1 * | 1/2020 | Weldemariam | G06F 16/1805 |
| 2020/0045519 A1 * | 2/2020 | Raleigh | H04M 15/765 |
| 2020/0127813 A1 * | 4/2020 | Millar | G06Q 20/363 |
| 2020/0202029 A1 * | 6/2020 | Tadayon | H04W 12/02 |
| 2020/0211409 A1 * | 7/2020 | Latorre | G16H 10/60 |
| 2020/0251213 A1 * | 8/2020 | Tran | G06N 20/20 |
| 2020/0387893 A1 * | 12/2020 | Maim | G09C 1/00 |
| 2020/0394709 A1 * | 12/2020 | Cella | G06N 3/042 |
| 2021/0004791 A1 * | 1/2021 | Liu | G06Q 20/0655 |
| 2021/0012013 A1 * | 1/2021 | Gourisetti | H04L 9/0637 |
| 2021/0056547 A1 * | 2/2021 | Monica | H04L 9/0637 |
| 2021/0056548 A1 * | 2/2021 | Monica | G06F 21/6218 |
| 2021/0097532 A1 * | 4/2021 | Mahasuverachai | H04L 9/0643 |
| 2021/0117933 A1 * | 4/2021 | Lobner | G06Q 10/063114 |
| 2021/0119785 A1 * | 4/2021 | Ben-Reuven | H04L 9/3239 |
| 2021/0143979 A1 * | 5/2021 | Revankar | H04L 9/0637 |
| 2021/0233162 A1 * | 7/2021 | Hockey | G06F 16/951 |
| 2021/0248110 A1 * | 8/2021 | Maurer | G06F 9/45508 |
| 2021/0248514 A1 * | 8/2021 | Cella | G06V 20/20 |
| 2021/0342836 A1 * | 11/2021 | Cella | H04L 9/3239 |
| 2021/0398093 A1 * | 12/2021 | Lynch | G06Q 20/389 |
| 2022/0075756 A1 * | 3/2022 | Blackshear | H04L 67/125 |
| 2022/0164338 A1 * | 5/2022 | Blackshear | H04L 9/32 |
| 2022/0174059 A1 * | 6/2022 | Fields | H04L 9/3239 |
| 2022/0198554 A1 * | 6/2022 | Filter | G06Q 40/00 |
| 2022/0215418 A1 * | 7/2022 | Olson | G06Q 30/0233 |
| 2022/0272084 A1 * | 8/2022 | Hyatt | H04W 12/06 |
| 2022/0300955 A1 * | 9/2022 | Hinkel | H04L 9/3247 |
| 2022/0366494 A1 * | 11/2022 | Cella | H04L 9/50 |
| 2022/0404949 A1 * | 12/2022 | Berquam | G06F 3/011 |
| 2023/0004578 A1 * | 1/2023 | Harold | G06F 16/275 |
| 2023/0070668 A1 * | 3/2023 | Gamaroff | H04L 9/3239 |
| 2023/0113492 A1 * | 4/2023 | Destefanis | G06F 16/1837 707/776 |
| 2023/0113947 A1 * | 4/2023 | Spangenberg | G06F 16/27 705/310 |
| 2023/0131232 A1 * | 4/2023 | Ratnakaram | G06Q 20/389 705/64 |
| 2023/0298015 A1 * | 9/2023 | Kiraz | H04L 9/0861 |
| 2023/0342734 A1 * | 10/2023 | Padmanabhan | H04L 9/3297 |
| 2023/0376581 A1 * | 11/2023 | Shear | G06F 21/32 |
| 2024/0202725 A1 * | 6/2024 | Anapliotis | G06Q 30/0607 |
| 2025/0117791 A1 * | 4/2025 | Chayanam | H04L 63/08 |

FOREIGN PATENT DOCUMENTS

| | | | | |
|---|---|---|---|---|
| CN | 104106276 A | * | 10/2014 | G06F 3/08 |
| CN | 105229596 A | * | 1/2016 | G06F 21/31 |
| CN | 108027867 A | * | 5/2018 | G06F 12/1408 |
| CN | 109074565 A | | 12/2018 | |
| CN | 109993004 A | | 7/2019 | |
| CN | 110580653 A | | 12/2019 | |
| CN | 110599177 A | | 12/2019 | |
| CN | 111386514 A | * | 7/2020 | H04L 9/50 |
| CN | 112559990 A | * | 3/2021 | G06Q 40/03 |
| CN | 113228023 A | * | 8/2021 | G06F 21/64 |
| CN | 113272850 A | * | 8/2021 | G06Q 10/04 |
| CN | 113784238 A | * | 12/2021 | H04L 63/08 |
| CN | 115345602 A | * | 11/2022 | G06Q 20/06 |
| CN | 113784238 B | * | 4/2023 | H04L 63/08 |
| CN | 118175137 A | * | 6/2024 | H04L 61/4511 |
| CN | 119226395 A | * | 12/2024 | |
| CN | 119698628 A | * | 3/2025 | H04W 12/08 |
| EP | 3890237 A1 | * | 10/2021 | G06F 16/2379 |
| EP | 3665857 B1 | * | 2/2022 | H04L 9/50 |
| EP | 3659086 B1 | * | 8/2023 | G06F 16/2255 |
| EP | 4235552 A2 | * | 8/2023 | G06F 16/137 |
| EP | 4411618 A1 | * | 8/2024 | G06Q 20/3825 |
| JP | 2023123754 A | * | 9/2023 | G06Q 20/389 |
| KR | 20210122913 A | * | 4/2019 | |
| KR | 20190132160 A | * | 11/2019 | G06Q 20/367 |
| WO | WO-2012042262 A1 | * | 4/2012 | G06Q 20/3263 |
| WO | 2015/175722 A1 | | 11/2015 | |
| WO | WO-2017136956 A1 | * | 8/2017 | G06F 16/27 |
| WO | WO-2019142049 A1 | * | 7/2019 | G06F 16/137 |
| WO | WO-2019211691 A1 | * | 11/2019 | G06F 16/2379 |
| WO | WO-2020061105 A1 | * | 3/2020 | G06F 21/33 |
| WO | WO-2020125839 A1 | * | 6/2020 | G06F 21/31 |
| WO | WO-2021178112 A1 | * | 9/2021 | G06F 21/6245 |
| WO | WO-2021225780 A1 | * | 11/2021 | G06F 16/27 |
| WO | WO-2024092324 A1 | * | 5/2024 | |
| WO | WO-2024263101 A1 | * | 12/2024 | G06Q 20/3674 |

OTHER PUBLICATIONS

A. A. Monrat, O. Schelen and K. Andersson, "A Survey of Blockchain From the Perspectives of Applications, Challenges, and Opportunities," in IEEE Access, vol. 7, pp. 117134-117151. https://ieeexplore.ieee.org/document/8805074?source=IQplus (Year: 2019).*

Christidis et al., Blockchains and Smart Contracts for the Internet of Things. Special Section on the Plethora of Research in Internet of Things (IoT). https://ieeexplore.ieee.org/stamp/stamp.jsp?arnumber=7467408 (Year: 2016).*

Wang et al., A Survey on Consensus Mechanisms and Mining Strategy Management in Blockchain Networks. Digital Object Identifier 10.1109/ACCESS.2019.2896108. https://ieeexplore.ieee.org/stamp/stamp.jsp?arnumber=8629877 (Year: 2018).*

Christidis, et al., Blockchains and Smart Contracts for the Internet of Things, Special Section on the Plethora of Research in Internet of Things (IoT). May 8, 2016. https://ieeexplore.ieee.org/stamp/stamp.jsp?arnumber=7467408 (Year: 2016).*

V. Dedeoglu, et al., Blockchain Technologies for IoT, https://www.researchgate.net/profile/Raja-Jurdak/publication/333639731_Blockchain_Technologies_for_IoT/links/6244fa8121077329f2e29f1a/Blockchain-Technologies-for-IoT.pdf 2020 (Year: 2020).*

F. Pianese, M. Signorini and S. Sarkar, "Small Transactions with Sustainable Incentives," 2018 9th IFIP International Conference on

(56) References Cited

OTHER PUBLICATIONS

New Technologies, Mobility and Security (NTMS), Paris, France, 2018, pp. 1-5. https://ieeexplore.ieee.org/document/8328744?source=IQplus (Year: 2018).*

D. Tosh, S. Shetty, P. Foytik, C. Kamhoua and L. Njilla, "CloudPOS: A Proof-of-Stake Consensus Design for Blockchain Integrated Cloud," 2018 IEEE 11th International Conference on Cloud Computing (CLOUD), San Francisco, CA, USA, 2018, pp. 302-309. https://ieeexplore.ieee.org/document/8457813?source=IQplus (Year: 2018).*

Xie et al., Blockchain challenges and opportunities a survey, Int. J. Web and Grid Services, vol. 14, No. 4, 2018, Inderscience Enterprises Ltd., https://www.henrylab.net/wp-content/uploads/2017/10/blockchain.pdf (Year: 2018).*

International Search Report for PCT/IB2020/061255, prepared by the Canadian Intellectual Property Office, mailing date Mar. 22, 2021, 3 pages.

Search Report for Singapore Application No. 10201912999V, prepared by the Intellectual Property Office of Singapore, completion date Feb. 5, 2020, 2 pages.

Król M. et al., "Proof-of-Prestige: A Useful Work Reward System for Unverifiable Tasks," IEEE International Conference on Blockchain and Cryptocurrency (ICBC), May 17, 2019, 9 pages.

Extended European Search Report of European patent application No. 20904496.5 dated Dec. 1, 2023, 8 pages.

First Office Action and Search Report of Chinese patent application No. 2020800813104 dated Sep. 27, 2022, 9 pages.

Yu Jiangshan et al: "RepuCoin: Your Reputation Is Your Power", IEEE Transactions on Computers, IEEE, USA, vol. 68, No. 8, Aug. 1, 2019 (Aug. 1, 2019), pp. 1225-1237, XP011734125, ISSN: 0018-9340, DOI: 10.1109/TC.2019.2900648 [retrieved on Jul. 8, 2019].

Oliveira Marcela T. De et al: "Blockchain reputation-based consensus: A scalable and resilient mechanism for distributed mistrusting applications", Computer Networks, vol. 179, Jun. 12, 2020 (Jun. 12, 2020), p. 107367, XP093104610, Amsterdam, NL, ISSN: 1389-1286, DOI:10.1016/j.comnet.2020.107367.

Gavin Wood: "Polkadot: Vision for a Heterogeneous Multi-Chain Framework", Draft 1, Dec. 8, 2016 (Dec. 8, 2016), pp. 1-21, XP055743869, Retrieved from the Internet: URL:https://github.com/polkadot-io/polkadot-white-paper/raw/master/PolkaDotPaper.pdf, [retrieved on Oct. 26, 2020].

Kwon Jae et al: "Whitepaper—Resources—Cosmos Network", Mar. 17, 2019 (Mar. 17, 2019), XP055789314, Retrieved from the Internet: URL:https://web.archive.org/web/20190317203345/https://cosmos.network/resources/whitepaper, [retrieved on Mar. 24, 2021].

\* cited by examiner

METHOD AND SYSTEM FOR TRANSACTION VALIDATION IN A DISTRIBUTED COMPUTING SYSTEM

CROSS-REFERENCE TO RELATED APPLICATION

This application is the U.S. national phase of PCT Application No. PCT/IB2020/061255 filed on Nov. 30, 2020, which claims priority to SG patent application Ser. No. 10/201,912999V filed on Dec. 23, 2019, the disclosures of which are incorporated in their entirety by reference herein.

FIELD OF THE INVENTION

The present application relates to a method and system for transaction validation in a distributed computing system (such as a blockchain network). The transactions to be validated may be non-financial transactions or financial transactions (such as cryptocurrency transactions).

BACKGROUND OF THE INVENTION

Financial and other transactions are commonly conducted or facilitated electronically, whether in a traditional currency or a pseudo- or cryptocurrency (e.g. Bitcoin). Validation or authentication of each transaction is important. With cryptocurrencies, this validation may be effected with proof-of-work (POW) or "Proof of Stake" to achieve consensus between computing device peers in a distributed ledger such as blockchain. In POW, a device that meets a proof-of-work requirement for a transaction block will have that block accepted by peers, and the user receives a reward in the form of cryptocurrency. Such a consensus algorithm is used to achieve the required consensus, such as in a blockchain, but can also be employed in other, non-blockchain environments.

U.S. Pat. No. 7,356,696 discloses a method of using a computational effort invested in a POW. The method includes distributing a computational task among a plurality of computing devices for execution within a specified interval of time as a POW, receiving the POW relating to the task from one of the entities, using the POW to accomplish the task, and distributing the POW as a POW.

U.S. Pat. No. 8,412,952 discloses a computer-implemented method for authenticating requests from a client running trialware through a POW protocol. A request received from a client running trialware is analysed. A cryptographic puzzle is generated if an authentication token is not included with the request. The cryptographic puzzle is transmitted to the client. A solution to the cryptographic puzzle received from the client is analysed. A response to the request is generated if the received solution to the puzzle is validated.

International Patent Application Publication No. WO 2015/175722 discloses a healthcare transaction validation system and method, in which healthcare transactions associated with a person (e.g. a patient) are compiled into a chain of healthcare transaction blocks, constituting a chronicle of the person's evolving healthcare. When a transaction is conducted, the corresponding healthcare parameters (e.g., inputs, outputs, clinical evidence, outcomes, etc.) are sent to one or more validation devices. The devices establish validity of the transaction and generate a new block via POW. Once the new block has been calculated it can be appended to the person's healthcare blockchain.

SUMMARY OF THE INVENTION

It is object of the present invention to a provide transaction validation method for use in a distributed computing system.

The following presents a simplified summary of the present invention, in order to provide a basic understanding of some of its aspects. The summary is not an extensive overview of the present invention. It is neither intended to identify key or critical elements of the present invention nor to delineate the scope of the present invention. The following summary merely presents some concepts of the present invention in a simplified form as a prelude to the description below.

According to a first broad aspect of the present invention, there is provided a transaction validation method for use in a distributed computing system, the method comprising:

associating first and second parameters with respective users of the distributed computing system, the first parameter being determined based on an increment for each validation performed by a respective user and a decrement for each transaction validation performed by the respective user, the second parameter being determined based on a transaction history and a validation history of the respective users;

registering a plurality of the users as validating users that are authorized to validate transactions visible to the distributed computing system and that require validation;

a first of the users initiating a transaction with a user computing device;

associating respective validation priorities in respect of performing a validation task with members of a first set of validating users comprising at least one of the validating users other than the first of the users, the respective validation priorities being determined based on the first and second parameters associated with the members of the first set of validating users, the validation task comprising validation of the transaction;

rendering the transaction visible to respective computing devices of one or more of the members of the first set of validating users;

members of a second set of validating users performing the validation task, the second set of validating users comprising one or more of the first set of validating users;

decrementing the first parameter associated with the first user by a first amount upon completion of the validation task, and incrementing the first parameter associated with the members of the second set by respective second amounts upon completion of the validation task; and updating the second parameter associated with the members of the second set upon completion of the validation task.

Thus, in broad terms, the method is based on reciprocity: members validate the transactions of other members in return for others validating theirs. In this manner, only members who actually use the network to validate their transactions will have the right to validate the transactions of others, hence the name: Proof-of-Use.

Validation may be performed, in some embodiments, by a plurality of validating users (that is, the second set of validating users), which may constitute all or a subset of the members of the first set of validating users to whom the transaction is offered by being rendered visible. The members to whom the transaction is offered for validation, in embodiments in which validation by a plurality of members is permitted, is referred to herein as a 'validating user pool'.

In an embodiment, the method includes rendering the transaction task visible to respective computing devices of the members of the first set with sufficient validation priority (being typically a validation priority above a predefined validation priority threshold).

In an embodiment, the first and second amounts are (i) predefined, or (ii) determined according to at least one characteristic of the transaction, or (iii) determined according to a size of the transaction and/or a nature of the transaction.

In an embodiment, the first amount has a predefined relationship to the second amounts. In one typical example, the first amount equals the sum of the second amounts.

In an embodiment, the second amounts are equal. In some embodiments, the second amounts are based on the first and/or second parameters of the members of the second set.

In an embodiment, the validating of the transaction comprises hashing the transaction into a block, the method comprising the members of the second set subsequently adding the block to a blockchain.

In an embodiment, the method includes determining the second parameter based on periods between respective increments and decrements in the first parameter of the respective users.

In an embodiment, the method comprises modifying the first parameter of the first user when the first parameter of the first user does not satisfy a first threshold so that the first parameter of the first user satisfies the first threshold.

In an embodiment, the method comprises broadcasting the transaction on the distributed computing system such that the transaction is visible to the respective computing devices of one or more members of the first set. In an example, the method includes broadcasting the transaction on the distributed computing system such that the transaction is visible to the respective computing devices of all of the other transaction validators. In certain embodiments, the method comprises broadcasting or distributing the validation task to one or more members of the first set for validation whose respective priority meets a third threshold.

In an embodiment, the first threshold is expressed in the form of cryptocurrency.

In some embodiments, the validation priority is such that, if a plurality of the other transaction validators validates the transaction, the validation of the transaction is credited to the first other transaction validator to validate the transaction.

In an embodiment, the transaction validation method comprises converting the first user's first parameter (or a value assigned thereto) into crypto- or other currency based on a predefined exchange rate. In the example of Bitcoin, such an exchange rate may be expressed in the form of, for example, "x Bitcoin per unit of first parameter", where x may be integral or, more probably at current Bitcoin values, a fraction of a Bitcoin (e.g. x=0.001). The method would typically then include debiting the first user's first parameter by the desired amount for conversion, and crediting the user with the appropriate amount of Bitcoin.

In certain embodiments, the first amount is equal to the second amount when there is one validating user, and equal to the sum of the second amounts when there is more than one validating user.

In embodiments in which the first amount is greater than the second amount (if there is one validating user) or greater than the sum of the second amounts (if there is more than one validating user), the deference between the first and second amounts (or sum of the second amounts) may be relatively small (e.g. 1%, 5%, 10%, <1%, <5% or <10%). Likewise, in embodiments in which the first amount is less than the second amount (or sum of the second amounts), the deference between the first and second amounts (or sum of the second amounts) may be relatively small. The difference may be regarded as a form of arbitrage, such as in implementations in which it is desired to maintain a constant (or nearly constant) total sum of all users' or validating users' first parameters (especially in those embodiments that include incrementing and decrementing the first parameters of users in response to conditions additional to that of transaction validation).

In another embodiment, the validation priority is such that, if a plurality of the other transaction validators validates the transaction, the validation of the transaction is credited to the validating other transaction validator associated with the higher or highest validation priority.

According to a second broad aspect of the present invention, there is provided a transaction validation system, comprising:
  a membership manager configured to register a plurality of the users as validating users that are authorized to validate transactions visible to the distributed computing system and that require validation;
  a first parameter determiner configured to associate a first parameter with the respective users, the first parameter being determined by the first parameter determiner based on an increment for each validation performed by a respective user and a decrement for each validated transaction performed by respective users;
  a second parameter determiner configured to associate a second parameter with the respective users, the second parameter being determined by the second parameter determiner based on a transaction history and a validation history of respective users;
  a transaction prioritizer configured to associate respective validation priorities in respect of performing a validation task with members of a first set of validating users comprising at least one of the validating users other than the first of the users, the respective validation priorities being determined based on the first and second parameters associated with the members of the first set of validating users, the validation task comprising validation of the transaction;
  a transaction assigner configured to render the transaction visible to respective computing devices of one or more of the members of the first set of validating users; and
  a transaction validator controllable by members of a second set of validating users performing the validation task, the second set of validating users comprising one or more of the first set of validating users;
  wherein the first parameter determiner is configured to respond to completion of the validation task by decrementing the first parameter associated with the first user by a first amount, and incrementing the first parameter associated with the members of the second set by respective second amounts; and
  the second parameter determiner is configured to respond to completion of the validation task by updating the associated with the members of the second set.

In an embodiment, the transaction assigner is configured to render the transaction task visible to respective computing devices of the members of the first set with sufficient validation priority (being typically a validation priority above a predefined validation priority threshold).

In an embodiment, the first parameter determiner is configured to employ values for the first and second amounts that are (i) predefined, or (ii) determined the second parameter determiner according to at least one characteristic of the transaction, or (iii) determined by the second parameter determiner according to a size of the transaction and/or a nature of the transaction.

In an embodiment, the first amount has a predefined relationship to the second amounts. On an example, the first amount equals the sum of the second amounts. In an embodiment, the second amounts are equal. In some embodiments, the second amounts are based on the first and/or second parameters of the members of the second set.

In an embodiment, the transaction validator is configured to validate the transaction by hashing the transaction into a block for subsequent addition to a blockchain.

In an embodiment, the second parameter determiner is configured to determine the second parameter based on periods between respective increments and decrements in the first parameter of the respective users. In an embodiment, the first parameter determiner is configured to modify the first parameter of the first user when the first parameter of the first user does not satisfy a first threshold so that the first parameter of the first user satisfies the first threshold.

In an embodiment, the transaction assigner is configured to broadcast the transaction on the distributed computing system such that the transaction is visible to the respective computing devices of one or more members of the first set. In an example, the transaction assigner is configured to broadcast the transaction on the distributed computing system such that the transaction is visible to the respective computing devices of all of the other transaction validators. In certain embodiments, the transaction assigner is configured to broadcast or distribute the validation task to one or more members of the first set for validation whose respective priority meets a third threshold.

In an embodiment, the first threshold is expressed in the form of cryptocurrency.

In some embodiments, the validation priority is such that, if a plurality of the other transaction validators validates the transaction, the validation of the transaction is credited to the first other transaction validator to validate the transaction.

In an embodiment, the system is configured to convert the first user's first parameter (or a value assigned thereto) into crypto- or other currency based on a predefined exchange rate. In the example of Bitcoin, such an exchange rate may be expressed in the form of, for example, "x Bitcoin per unit of first parameter", where x may be integral or, more probably at current Bitcoin values, a fraction of a Bitcoin (e.g. x=0.001). The system would typically then debit the first user's first parameter by the desired amount for conversion, and credit the user with the appropriate amount of Bitcoin.

In certain embodiments, the first parameter determiner is configured such that the first amount is equal to the second amount when there is one validating user, and equal to the sum of the second amounts when there is more than one validating user.

In embodiments in which the first amount is greater than the second amount (if there is one validating user) or greater than the sum of the second amounts (if there is more than one validating user), the deference between the first and second amounts (or sum of the second amounts) may be relatively small. Likewise, in embodiments in which the first amount is less than the second amount (or sum of the second amounts), the deference between the first and second amounts (or sum of the second amounts) may be relatively small.

In another embodiment, the validation priority is such that, if a plurality of the other transaction validators validates the transaction, the validation of the transaction is credited to the validating other transaction validator associated with the higher or highest validation priority.

According to a third broad aspect of the present invention, there is provided computer program code configured to, when executed by one or more processors, control one or more computing devices to implement the method of the first broad aspect. According to this aspect, there is also provided a computer-readable medium (which may be non-transitory), comprising such computer program code.

It should be noted that any of the various individual features of each of the above aspects of the invention, and any of the various individual features of the embodiments described herein including in the claims, can be combined as suitable and desired.

BRIEF DESCRIPTION OF THE DRAWINGS

In order that the invention may be more clearly understood, embodiments are now described, by way of example, with reference to the accompanying drawing (in which like reference numeral indicate similar elements), in which.

DETAILED DESCRIPTION OF THE PREFERRED EMBODIMENTS

Figure 1:
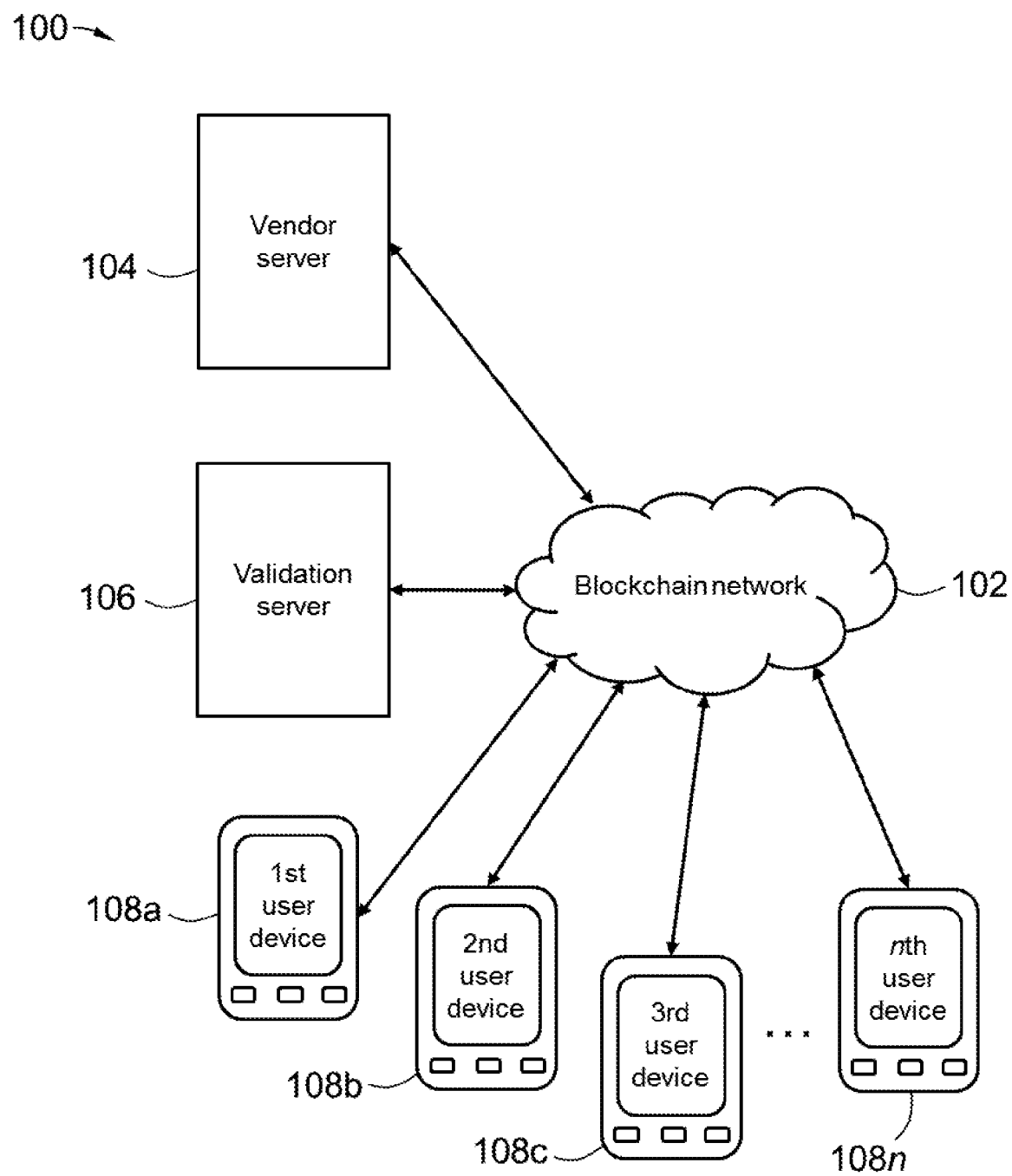
FIG. 1 is a schematic view of a proof of use transaction validation system according to an embodiment of the present invention.

The present invention will be further described hereinafter with reference to the accompanying drawings. It is to be understood that specific embodiments described herein are only intended to explain the present invention, and are not taken to limit the present invention. Further, it will be appreciated that the examples provided represent only one of many possible implementations of the present invention. Modifications and variations are possible in light of the above teachings or may be acquired from practicing of the disclosure, without departing from the breadth or scope.

It is also to be understood that the following claims are intended to cover all of the generic and specific features of the invention herein described and all statements of the scope of the invention which, as a matter of language, might be said to fall therebetween.

As used herein, singular forms, such as "a" and "an," are intended to include the plural forms as well, unless the context indicates otherwise. Additionally, the terms, "includes," "including," "comprises" and "comprising," specify the presence of the stated elements or steps but do not preclude the presence or addition of one or more other elements or steps.

As used herein, the term "blockchain" refers to a public ledger of all transactions of a blockchain-based network. One or more computing devices may comprise a blockchain network, which may be configured to process and record transactions as part of a block in the blockchain. Once a block is completed, the block is added to the blockchain and the transaction record thereby updated. In many instances, the blockchain may be a ledger of transactions in chronological order, or may be presented in any other order that may be suitable for use by the blockchain network. In some configurations, transactions recorded in the blockchain may include a destination address and a transaction amount, such that the blockchain records how much is attributable to a specific address. In some instances, the transactions are financial and while in others, they are not financial, or might include additional or different information, such as a source address, timestamp, etc. In some embodiments, a blockchain may also alternatively include nearly any type of data as a form of transaction that is or needs to be placed in a distributed database that maintains a continuously growing list of data records hardened against tampering and revision, even by its operators, and may be confirmed and validated by the blockchain network through proof of work and/or any other suitable verification techniques associated therewith. In some cases, data regarding a given transaction may further include additional data that is not directly part of the transaction appended to transaction data. In some instances, the inclusion of such data in a blockchain may constitute a transaction.

Overview

The proof of use transaction validation method and system of the present embodiment is adapted for use over a distributed computing system, such as employing blockchain technology. It is envisaged that the transactions that can be validated with the proof of use method would include any transaction that employs or can be implemented using a distributed ledger such as in a blockchain network (such as purchases and loans or elements thereof, as exemplified below), and may be transactions that are financial (involving, for example, cryptocurrency) or non-financial.

This 'proof of use' is employed to validate such transactions, in order to maintain the integrity and security of the distributed ledger (just as, in the background art, proof-of-work methodologies are used for the same purpose). In broad terms, users of the distributed computing system are assigned two attributes:

'Validation performance parameter' or VPP. This first parameter, in broad terms, may be regarded as a measure of the difference between the number of validations performed by a user and the number of transactions of that user validated by others; this is because a user's VPP is incremented when that user validates a transaction but is decremented when that user's transaction is validated. It should be noted, however, that— in some embodiment—the size of such an increment does not equal the size of such a decrement (as discussed below), so this is only a broad characterization of VPP. In this embodiment, this parameter can generally be positive or negative—the former corresponding to a situation in which a user has validated more transactions than has had transaction validated by others, the latter corresponding to a situation in which a user has had more transactions validated by other members than he or she has validated others' transactions.

'Validation equilibration parameter', or VEP. This second parameter is a measure of the speed or promptness with which the user increases his or her validation performance parameter, especially from negative to non-negative.

In addition, for any particular transaction requiring validation, the users are assigned a priority that is used to control their respective access to validate others' transactions—and to compete for validation tasks with other users who are given access to validate the same transactions. That is, (i) a user with a lower validation performance parameter has priority over a user with a higher validation performance parameter, and (ii) a user with higher validation equilibration parameter has priority over a user with a lower validation equilibration parameter. The latter criterion also allows discrimination between plural users competing for the same validation, such that a user with higher priority may be deemed to have validated a transaction even if validating after another user (employing, for example, higher processor and/or network connection speeds, or being more personally prompt), on the basis of that higher priority.

Thus, according to this embodiment, a user that performs many validations and does so promptly will increase both his or her validation performance parameter and his or her validation equilibration parameter (especially if bringing the validation performance parameter from negative to non-negative). This affects the user's priority in subsequent validations, as is described in greater detail below.

It should be noted that the reward for a particular validation—that is, an increment in VPP—need not go to a single user/member (as in the case of the Proof of Work approach). Instead, the reward may be distributed among a plurality of validators according to each validator's respective VPP and/or VEP, as is described in greater detail below. In such embodiments, the validation task is offered to a 'validating user pool', one or more of which may be the ultimate validator(s). Thus, in these embodiments, one or more of the members of the validating user pool act as validators for a single transaction. Technically, this may involve either a plurality of users verifying a single block via a shared computing interface, such that a single validation is performed by the plurality of users. For example, the transaction validation may be configured to require that each block (represented by its set of transactions) be validated by more one member of the validating user pool, in order to bring consensus to the transaction (and thus block) validation process. In addition, in such embodiments, a pre- or dynamically defined validation time window is employed by the system, during which the members of the validating user pool may each validate the transaction, and after which the transaction will be deemed validated if the requisite number (discussed below) of members of the pool have validated the transaction.

This does not mean that all available validators (viz. those members authorized to validate transactions) will always be required to validate every transaction. Rather, in those embodiments that support validation by a plurality of validators, the validating user pool of validators for any particular transaction generally comprises a subset of the available validators. For example, the system may be configured to select a validating user pool for a transaction according to a predefined rule or rules (e.g. "the subset of authorized validators with a VPP below a predefined threshold", "the subset of authorized validators with a VEP above a predefined threshold", "the subset of authorized validators with a VPP below a predefined first threshold and a VEP above a predefined second threshold").

In addition, the system may be configured, once the validating user pool has been defined, to accept validation as effected when all members of the pool have validated the transaction. Alternatively, the system may be configured such that, once the validating user pool has been defined, to accept validation as effected when a subset of that pool has validated the transaction. For example, the validating user pool may contain n members (e.g. n=200), but satisfactory validation may be deemed to have been performed once a threshold number m (where m<n) or threshold percentage x % (where x<100%) of the pool has validated the transaction (always provided that at least one member of the pool has validated the transaction).

It should also be noted that, if validation is performed by more than one member of such a pool, the increment in VPP (or 'reward') for performing validation will—in this embodiment—be shared among the validators according to the respective VEP and/or VPP of the actual validators. For example, the increment in VPP may be distributed in what may be termed a 'waterfall' manner: the increments in the VPP of validators with a lower VPP and higher VEP is constrained not to exceed 50% of (i) the total verification cost of the block, or (ii) the average amount for that block by which VPP incrementor 220 has incremented the VPPs of members seeking validation of their transactions (see step 362 of FIG. 4)—whichever is lower. The same applies to members with the next level of VPP/VEP (i.e. falling in the next lowest band of VPP and next highest band of VEP), and so on. This will help to avoid the controlling of the process by members with the capacity/resources to submit and validate large numbers of large transactions and hence maintain a high priority—and thereby dominate the verification process and potentially gain the ability to validate bogus blocks.

Also, only those who actually perform validation can receive a reward. This can also prompt competition between members, as even being included in a validating user pool does not ensure the receipt of a reward: the member of the pool must validate the transaction to receive an increment in VPP. This constraint is particularly effective in embodiments such as those of the previous paragraph. If validation is deemed effected when only a subset of the validating user pool has validated the transaction, there will be competition to be in that subset (such as by being amongst the first m members of the pool of n to validate a transaction).

It should be further noted that the system may be configured either to permit or require validation by more than one member. A system that permits validation by more than one member, but does not require it, is equivalent to employing a parameter m, as defined above, with a value of 1.

According to one embodiment, there is provided a proof of use transaction validation system, as shown in schematic form at 100 in FIG. 1, depicted with a vendor server 104 of a financial institution that provides goods or services via system 100. System 100 includes a distributed computing system in the form of a blockchain network 102, a validation server 106 of a network authority, and a plurality of user devices 108a, b, c, . . . n. Vendor server 104, validation server 106 and user devices 108a, b, c, . . . n communicate via blockchain network 102, but—in addition—one or more of vendor server 104, validation server 106 and user devices 108a, b, c, . . . n can constitute a portion or portions of blockchain network 102, or indeed the entirety of blockchain network 102. In all such embodiments, communication—though via blockchain network 102—involves the use of a suitable communications network, most generally the internet. In this embodiment, blockchain network 102 includes validation server 106 and user devices 108a, b, c, . . . n—which are thus peer nodes (or simply 'peers') in blockchain network 102. (It will be noted, however, that only user devices 108a, b, c, . . . n act as peer nodes for validation purposes.) Furthermore, the users of user devices 108a, b, c, . . . n constitute a network of users (referred to herein as "the network"), linked in being permissioned users of system 10.

System 100 includes a plurality of user devices 108a, b, c, . . . , n of respective users. The minimum number of user devices sufficient for system 100 to be employed as intended is two; the maximum number is limited, in effect, only by the capacity of the various servers. It should be noted that user devices 108a, b, c, . . . , n, though depicted in the figure as portable computing devices, can assume any suitable form, configured to perform the functions discussed herein, such as desktop computers, laptop computers, notebook computers, tablet computers, mobile telephones, smartphones, smart televisions or wearable computing devices.

System 100 is configured to facilitate transactions and their validation by its users. The transactions described below thus include, for example, purchases of goods, applications for loans, leases or other services, and the transfer of funds from financial institution to users and vice versa.

Figure 2:
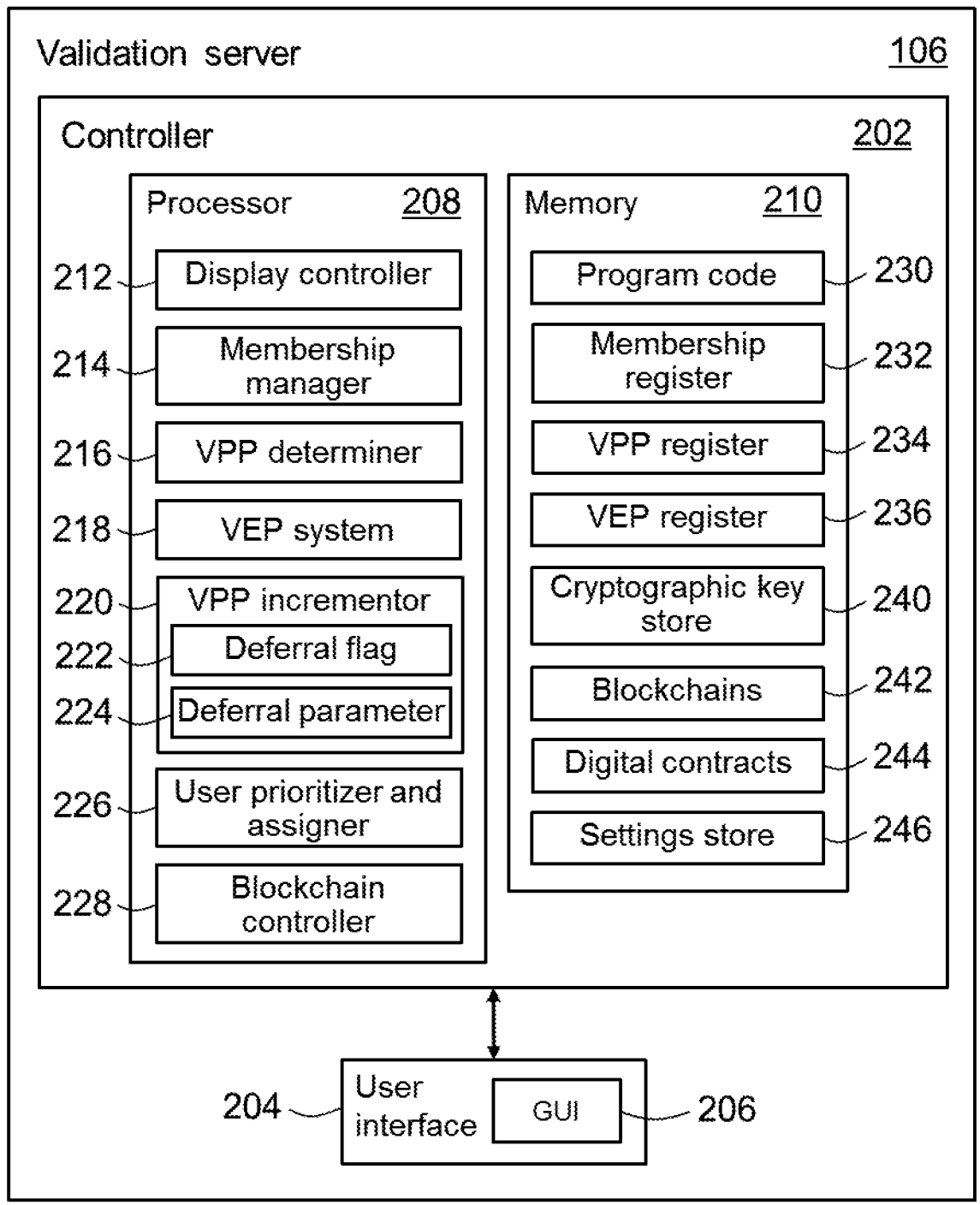
FIG. 2 is a schematic view of the validation server of the transaction validation system of FIG. 1.

FIG. 2 is a schematic view of validation server 106 of system 100. Referring to FIG. 2, validation server 106 includes a controller 202 and a user interface 204 (which includes a GUI 206). Controller 202 includes a processor 208 and memory 210. The term "processor" is used to refer to any device or devices that can process program instructions (such as in the form of program code stored in memory 210) and may comprise a microprocessor, microcontroller, programmable logic device or other computational device, a general purpose computer (e.g. a PC) or a server. Typically, memory 210 includes both volatile and non-volatile memory and more than one of each type of memory, with such memories being collectively represented by memory 210.

Processor 208 of validation server 106 includes a display controller 212 for controlling a display of user interface 204, a membership manager 214 configured to monitor membership applications, a first parameter determiner in the form of a VPP determiner 216 configured to determine each user's validation performance parameter (VPP), a second parameter determiner in the form of a VEP system 218 configured to determine each member's validation equilibration parameter (VEP) from member transaction and validation behaviour, a VPP incrementor 220 configured to increment or decrement the VPP of a member under particular circumstances, a user prioritizer and assigner 226 configured to determine each user's priority for use in receiving transaction validation tasks and to assign validation tasks according to each member's priority, and a blockchain controller 228 configured to add events to a blockchain on blockchain network 102. The functions of these components of processor 208 are described further below. It should be noted that these components are configured to initiate events or transactions in blockchain 102.

Memory 210 includes program code 230 for implementing the functions of processor 208, and various memory registers in which are stored the outputs of processor 208. Thus, memory 210 includes a membership register 232 of members, a VPP register 234 and a VEP register 236. Memory 210 also includes a cryptographic key store 240 (for storing the cryptographic keys required to access blockchains in blockchain network 102 to which validation server 106 requires access to perform its functions as described herein), a blockchain store 242, a digital contracts store 244, and a settings store 246.

Membership manager 214 is configured to monitor for membership applications (that is, applications for membership of the network). Membership applications are approved by blockchain network 102, either by a suitably configured digital contract or by existing members of the network. Indeed, a membership application can be treated within system 100 as a transaction that, if validated according this embodiment, grants the applying user the desired membership.

VPP determiner 216 of controller 208 is configured to determine each user's VPP in respect of transaction validations. VPP determiner 216 monitors for validations performed in blockchain network 102, and maintains a register (in VPP register 234) of the validation performance parameter of each member, based on the increments in VPP obtained by that member's validating transactions and the decrements in VPP resulting from that member having his or her transactions validated. The increments and decrements in this embodiment are uniform and identical, but in other embodiments may vary, such as according to the value of the transaction being validated and/or the VEP of the member initiating the transaction.

VEP system 218 is configured to determine the respective VEP of members according to the respective member's validated transactions and his or her validation of other members' transactions. In general, VEP system 218 determines a member's VEP based on, and directly proportional to, the speed with which a member increases his or her VPP by validating other members' transactions or suffers a decrease in VPP through having his or her own transactions validated. In this particular embodiment, VEP system 218 determines a member's VEP according to the promptness with which the member restores his or her own VPP following the validation of his or her own transaction(s), by validating other members' transactions. VEP system 218 can employ any suitable method for determining a VEP based on this criterion. In this embodiment the VEP of a member i is determined as inversely proportional to the period of time a VPP decrement occurs without a subsequent corresponding increment to the member's VPP (due to validating activity by member i). In a first example, $$VEP_i = \frac{100}{100 + \sum_1^n t_{i,j}},$$

where $t_{i,j}$ is the period (in, for example, days) that the jth validation decrement in VPP sustained by member i (with n validation decrements) remains before a corresponding increment occurs in VPP. In a second example, $t_{i,j}$ may be defined as the period (again, for example, in days)—if any—beyond a 'grace period' k, wherein k equals for example 1 day, 5 days, 10 days or 28 days.

In this embodiment (and in other embodiments, if desired), the members of the network must maintain a minimum VEP value (e.g. 60% or higher) in order to remain within the network. Those with a lower VEP score lose their membership and are excluded from the network owing to their poor performance.

In a third example, $$VEP_i = \frac{100}{100 + \sum_1^n (t_{i,j} - k)},$$

where $t_{i,j}$ is as defined in the first example and $\sum_1^n (t_{i,j}-k)$ is constrained over a VEP accounting period (e.g. the last 30 days or 60 days) to be ≥0. In this example, prompt validation behaviour by the member can negate the effect on his or her VEP of slower validation in any VEP accounting period, so that the member can maintain his or her VEP.

As will be noted, in these examples VEP is constrained by VEP system 218 to be from 0 to 1 (or 0% and 100%). For example, a member has conducted one transaction, which has been validated by another member, and the member performs a validation 12 days later. The member is involved in no other transactions or validations in the relevant VEP accounting period. In the first example, VEP system 218 determines a VEP for that member of 100/(100+12)=0.89. If k equal 10 days, in the second example, VEP system 218 determines a VEP for that member of 100/(100+2)=0.98.

If the member performs a second transaction and subsequent validation in the same VEP accounting period, but 8 days apart, VEP system 218 determines a VEP in the first example of 100/(100+12+8)=0.83, a VEP in the second example of 100/(100+2+0)=0.98, and a VEP in the third example of 100/(100+2−2)=1.

VEP system 218 stores the determined VEPs in VEP register 236.

VPP incrementor 220 of controller 208 is configured to monitor for member-initiated transactions of the type that require validation by a member of the network. When VPP incrementor 220 detects such a transaction on blockchain network 102, VPP incrementor 220 responds by checking the VPP of that member (as stored in VPP register 234). For example, in one variation of this embodiment, system 100 does not permit transactions to be validated if the member making the transaction would, as a result, have a negative VPP. Thus, in this variation, if the member initiating a transaction has a VPP that is indeed too low, VPP incrementor 220 responds automatically by incrementing that member's VPP either by the expected decrement due to validation or by an amount sufficient to leave the member with a VPP of zero after validation (as described in greater detail below). It will be appreciated that, when a new member initiates his or her first transaction (for example, attempts to make his or her first purchase or applies for his or her first loan), that member is likely to have a VPP of zero, so it is envisaged that commonly a new member will require—in this variation—that VPP incrementor 220 increment his or her VPP first. It should be noted that VPP incrementor 220 is configured not to increment the VPP of a member that has a sufficiently high VPP to conduct a transaction without incurring a negative VPP. It should also be noted that, after VPP incrementor 220 has incremented the VPP of a member and subsequently detects that that member has a VPP equal to or greater than the amount by which the VPP was incremented, VPP incrementor 220 initiates the decrementing of that member's VPP by the same amount.

However, if a transaction is validated, VPP incrementor 220 responds by incrementing the VPP of the validator by a first amount and decrementing the VPP of the member that initiated the transaction by a second amount. In this embodiment, the first and second amounts are equal, and are represented by ΔVPP.

In certain other embodiments, however, the first amount is greater than the second amount (or vice versa), with the difference generally being relatively small (e.g. 0.01%, 0.05%, 0.1%, 0.5%, 1%, 5%, 10%, <1%, <5% or <10%). The difference may be regarded as a form of arbitrage in implementations in which it is desired to maintain a constant (or nearly constant) total sum of all users' or transaction validators' VPPs. This may be employed in those embodiments in which the system increments and decrements the VPP of users in response to conditions additional to that of transaction validation—such as where the VPP of a member with an insufficient VPP is increased so that the member has a sufficient VPP to have his or her transaction validated. Generally, system 100, for example, operates in a 'steady-state' manner, as each increase in the VPP of a member (due to validation by that member) is associated with an identical decrease in the VPP of another member (due to validation that member's transaction being validated).

Temporarily increasing the VPP of a transacting member so that the member's transaction can be validated interrupts this steady-state, as it leads to a fluctuation in the total sum of all VPPs. A difference between the first amount and the second amount can be selected to dampen such fluctuations, especially if the magnitude of the difference is determined by the system dynamically in response to such fluctuations (possibly averaged over a predefined time period). For example, if system 100 initially employed equal values for the first and second amounts (e.g. 10), but determined that over a particular accounting period of predefined length (e.g. 1 day or 1 week) the total sum of all VPPs was supplemented by 10,000 in order to facilitate transaction validations, and that over the same period the total number of validated transactions was 1,000,000, system 100 could be configured to respond by reducing the second amount (so as to be less than the first amount) in the next account period, such as—in this example—by the ratio of the supplement and the number of validated transactions, in this example 10,000/1,000,000=0.01 or 0.1% of the initial value.

In some embodiments, transaction initiator 316 is configured to be controllable to initiate a deferral of the decrementing by VPP incrementor 220 of the member's VPP, to a later time of the member's choosing or convenience. In such embodiments, transaction initiator 316 includes a deferrer 318 that is user-controllable such that, when a member controls transaction initiator 316 to initiate a transaction, the member can—at the same time—control deferrer 318 to communicate a deferral request to VPP incrementor 220. The member can control deferrer 318 so as to select either a deferral of a selected period or end-point. VPP incrementor 220 is configured to associate the deferral request with the initiated transaction. This deferral request is stored as a deferral flag 222 and a deferral parameter 224: the former indicates the type of deferral request, the latter the duration or end-point of the deferral request as applicable. For example, deferral flag 222 and deferral parameter 224 may represent the requested deferral as follows:

| Deferral | Deferral Flag Value | Deferral Parameter |
|---|---|---|
| Default/No Deferral | 0 | — |
| Deferral by a selected period | 1 | Period of deferral |
| Deferral to a selected end-point | 2 | Date and time of end-point |

It should be noted that the maximum deferral period allowed for a member is the number of periods that will cause his or her VEP to reach its minimum value. A member cannot defer repayment beyond that period (as otherwise he or she would forfeit his or her membership).

VPP incrementor 220 implements the requested deferral in due course only if VPP incrementor 220 increases the member's VPP in the manner described above, such that VPP incrementor 220 will subsequently be required to decrement that member's VPP.

If in such embodiments the member controls deferrer 318 to initiate a deferral request of a selected period or end-point (expressed, for example, as a number of hours, day or weeks, or as a specific date and/or time), VPP incrementor 220 is configured to respond by deferring the decrementing of the member's VPP until that period (calculated from when the decrementing would have been effected without the deferral, from when the VPP is incremented, or from another suitable time) or the end-point is detected by VPP incrementor 220 to have passed. VPP incrementor 220 responds by setting deferral flag 222 to (in this example) 0 and decrementing the VPP of the member, if or as soon as the VPP of the member is sufficient to allow that decrementing.

In these embodiments, deferrer 318 is also controllable to initiate the display (to GUI 306) of whether a deferral request is in effect and what it is, as well as the remaining duration of the deferral (if any). By restricting the deferral to the maximum period beyond which the member would lose his or her membership, the deferral function remains consistent with the feature of reciprocity.

Settings store 246 includes first and second parameters that are predefined or dynamically set, and used to determine both members' priority in performing validation and, in some cases, whether a transaction will be permitted. In this embodiment, the first parameter is a 'threshold VPP' (or $VPP_{th}$) and the second parameter is a 'threshold VEP' (or $VEP_{th}$). The threshold VPP and threshold VEP can be defined in any suitable way. For example, in this embodiment, the threshold VPP is defined such that system 100 will permit a transaction by a member:
  a) if the validation of that transaction will leave the member (after the transaction has been validated) with a $VPP \geq VPP_{th}$; or
  b) if the validation of that transaction will leave the member (after the transaction has been validated) with a $VPP < VPP_{th}$, but the transacting member has a $VEP \geq VEP_{th}$.

Otherwise, system 100 will not permit the transaction.

In a variation of this embodiment, the threshold VPP is defined such that system 100 will permit a transaction by a member:
  a) if the member, before the validation of the transaction, has a $VPP \geq (VPP_{th} + \Delta VPP)$; or
  b) if the member, before the validation of the transaction, has a $VPP < (VPP_{th} + \Delta VPP)$, but the transacting member has a $VEP \geq VEP_{th}$.

Otherwise, system 100 will not permit the transaction.

The value of the threshold VPP typically depends on a standard or typical amount by which VPP is incremented when a member validates another member's transaction (in this embodiment, $\Delta VPP$), as the movement in VPP due to validation depends on that value. Hence, in this embodiment, the threshold VPP is expressed as a multiple of $\Delta VPP$ (e.g. 0, 0.5 or $1.0 \times \Delta VPP$), and in this example the threshold $VPP = 0 \times \Delta VPP = 0$. Hence, if VPP determiner 216 determines that validation of a transaction would cause the VPP of the transacting member to become negative, user prioritizer and assigner 226 responds by declining to assign the validation task to other members unless the VEP of the transacting member is greater than or equal to the threshold VEP. VEP is between 0 and 1, so the threshold VEP is—in this embodiment—may be, for example, 0.6, 0.7, 0.85 or, equivalently, 60%, 70%, 85%. If the transacting member fails this test, the transaction will not be validated so cannot proceed until the member sufficiently increases his or her VPP and/or VEP.

In an alternative embodiment, the VEP is expressed in ranges labelled symbolically (e.g. alphabetically) so that small changes in the numerical value of the VEP do not necessarily immediately alter a member's effective VEP when compared with the threshold VEP. For example:

| VEP | Exemplary Symbolic Labels | | |
|---|---|---|---|
| | Latin alphabet | Greek alphabet | Numerals |
| 0.9 ≤ VEP ≤ 1 | A | α | 1 |
| 0.8 ≤ VEP < 0.9 | B | β | 2 |
| 0.7 ≤ VEP < 0.8 | C | γ | 3 |
| 0.6 ≤ VEP < 0.7 | D | δ | 4 |
| 0.5 ≤ VEP < 0.6 | E | ε | 5 |
| 0 ≤ VEP < 0.5 | F | φ | 6 |

If, in this variation, the threshold VEP is expressed using the Latin alphabet and is "B", and the member has a VEP of 0.88 and hence B (thus able to satisfy the threshold VEP test), a drop in that member's numerical VEP of, for example, 0.05 would still leave the member with a VEP of B—and hence still able to satisfy the threshold VEP test (if required to do so).

In this embodiment, as introduced above, the members of the network must maintain a minimum VEP value (e.g. 60%, D, δ, 4, etc.) in order to remain a member of the network. Those with a lower VEP score lose their membership and are excluded from the network owing to their poor performance. However, the VEP of a member may drop below the minimum value owing to external factors (e.g. poor health, an accident, etc.). Hence, in some embodiments, the network may maintain the membership of that member if evidence is provided to, and verified by, the network of such circumstances, with normal rules of membership being applied after the circumstances of the member return to normal (and after a grace period of such normality during which the member has time to return to acceptable performance).

It should also be noted that, since this is a permissioned network, the identity of each member is verifiable. Therefore, it will not be possible for an expelled member to re-join using a different identity.

In another variation of this embodiment, members are not authorized to make transactions if doing so would give them a negative VPP (cf. FIG. 4, 360, 362, 364). In this variation, VPP incrementor 220 may increase the VPP of the transacting member. This is comparable to the arrangement described above, that is, with a threshold VPP of 0. However, in this variation, VPP incrementor 220 be configured not to increase the VPP of the member unless the member has a VEP at least equal to the threshold VEP.

User prioritizer and assigner 226 of validation server 106 is configured to determine a priority for each member, according to which transaction validation tasks are assigned to selected members—and hence made available for validation by those selected members. Initially it should be noted that, in this embodiment, only members with no pending transactions are allocated validation tasks in any single validation period or cycle. In addition, user prioritizer and assigner 226 is configured such that it does not allow the allocation of transaction validation tasks relating to transactions initiated by a particular member beyond a predefined proportion (e.g. 40%, 50% or 60%, stored in settings store 246) of the space capacity of a block. The rest of the transactions in the block must come from other members.

In this manner, system 100 prevents any member from aggregating his or her transactions alone into a single block. This is a security measure: system 100 does not allow any member to submit an entire block, so it is difficult for a member to add a bogus block to the blockchain.

Thus, in this embodiment and subject to the aforementioned constraints (and those discussed elsewhere herein), user prioritizer and assigner 226 is configured to determine priority according to two principal criteria: (i) members with lower VPPs (as determined by VPP determiner 216) have priority over members with higher VPPs, and (ii) members with higher VEPs (whether expressed numerically or as a range labelled, for example, alphabetically or the like) have priority over members with lower VEPs. Thus, user prioritizer and assigner 226 initially assigns a predetermined percentage $X_1$ of new transactions requiring validation to the member with the lowest VPP, a predetermined percentage $X_2$ of the remaining new transactions to the member with the next lowest VPP, a predetermined percentage $X_3$ of the remaining new transactions to the member with the next lowest VPP, etc (though with no member being allocated more than a predefined number or percentage of new transactions).

The values of $X_1, X_2, X_3, \ldots, X_n$ are stored in settings store 246 and are desirably defined (in some embodiments dynamically) in response to the size of the pool of transactions and the size of those transactions. This approach aims to distribute new transactions among the largest possible number of members. In one example, therefore, $X_1$=50%, in another example, 60%. In this embodiment, $X_1$, $X_2, X_3, \ldots, X_n$ are of identical value, but this need not be so: in some embodiments, $X_1, X_2, X_3, \ldots, X_n$ increase or decrease monotonically, or such that the total value of transactions allocated by each successive value of X is constant or approximately so.

In some embodiments, the VEP may be established only for members who have been registered onto the network for a certain period of time, for example, after n days (e.g. 60 days) from registration. In these embodiments, system 100 assigns a certain percentage of new transactions requiring validation to new members (e.g. members who are within n days from registration) who have no established VEP yet. This percentage may be dynamically adjusted. It is envisioned that, in these embodiments, a larger percentage of new transactions requiring validation may be assigned to new members during the early stages of system adoption (noting that, in the early stages, the majority of members are new). This percentage may then be reduced over time.

Once new transactions have been allocated according to VPP in this manner, user prioritizer and assigner 226 applies the second criterion, that is, members with higher VEPs have priority over members with lower VEPs. For example, if—in a particular transaction—members rated A or above are assigned the transaction so may compete, those members have priority over B-rated members. Note that, if a first and a second member have equal VPPs (but different VEPs), once the first member validates another member's transaction, the first member will have a higher VPP than the second member, thus decreasing his or her priority below that of the second member. Likewise, the priority of a member with a lower VEP will increase when he or she submits more transactions for validation, as doing so lowers his or her VPP.

Next, once user prioritizer and assigner 226 has applied both criteria, user prioritizer and assigner 226 broadcasts the new transaction(s) in cryptographically secure form (employing cryptographic key store 240) to all peer user devices 108a, b, c, . . . n such that validation may be accepted subsequently according to member priority. The validation tasks thus become accessible by the respective user devices 108a, b, c, . . . n of all of the members/validators (though with the constraint that a member cannot validate his or her own transactions). Validators (i.e. the users of user devices 108a, b, c, ... n that choose to perform validation) receive the broadcast transmission, and accumulate such potentially valid transactions, generally from a plurality of users. A block (i.e. a collection of transactions) on the blockchain may contain more than one transaction according to the design of the blockchain. As a consequence, the validators monitor for transactions and collect as many transactions as will fit onto a block (subject to the aforementioned limitation of use of the space capacity of a block by any single validator), but cannot include their own transactions: one or more other peers must act as a user's validator.

In an alternative embodiment, once user prioritizer and assigner 226 has applied both criteria, user prioritizer and assigner 226 broadcasts the new transaction(s) in cryptographically secure form to only the prioritized members/validators, in blockchain network 102, thereby implementing the assignment of these validation tasks according to the determined priorities. In still another alternative embodiment, each of user devices 108a, b, c, ..., n includes a user prioritizer and assigner, such that the broadcasting of the new transaction(s) is unnecessary. Indeed, all of the components of validation server 106 are, in some embodiments, replicated on each of the peer user devices 108a, b, c, ..., n in order to decentralise the trust functionality, such that validation server 106 may be omitted. However, locating user prioritizer and assigner 226 on a central server (validation server 106) has the advantage of easing the computing load of some or all of user devices 108a, b, c, ..., n.

It should also be noted that many of the operations of system 100 described herein can be implemented using digital contracts. A digital contract (sometimes referred to a 'Smart Contract') is a self-executing contract with the terms of the agreement between two parties being written into lines of code. The code and the agreements contained therein exist across a distributed, decentralised computing system, blockchain network 102 being an example of such a network. Thus, for example, the loans of this embodiment (though not in all embodiments) may be in the form of so-called 'smart loans', being loans governed by digital contracts on blockchain network 102. In some other embodiments, the loans are not smart loans, but instead are standard loans.

Thus, digital contracts store 244 of validation server 106 stores precedent or template digital contracts, suitable configured to be deployed in blockchain network 102 to perform various functions of system 10. For example, the functions initiated by VEP system 218, VPP determiner 216, and user prioritizer and assigner 226 can performed by one or more such digital contracts recorded in blockchain network 102.

Figure 3:
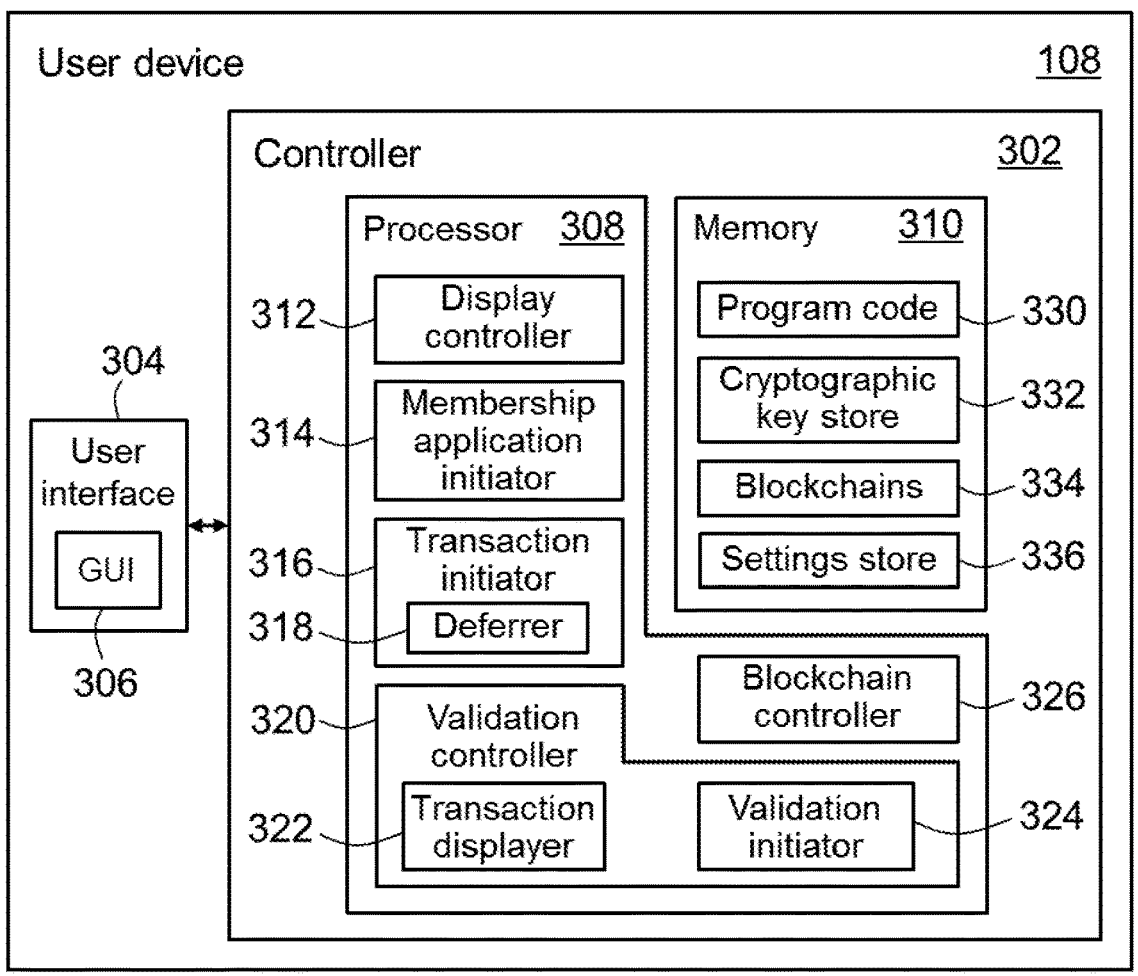
FIG. 3 is a schematic view of an exemplary user device of the transaction validation system of FIG. 1.

FIG. 3 is a schematic view of a user device 108, exemplifying user devices 108a, b, c, ..., n. User device 108 includes a controller 308 and a user interface 304 (with a GUI 306). Controller 302 includes a processor 308 and memory 310. Processor 308 includes a display controller 312 for controlling a display of user interface 304, a membership application initiator 314 configured to be controllable by the user of user device 108 to submit a membership application to blockchain network 102, a transaction initiator in the form of transaction initiator 316 configured to be controllable by the user of user device 108 to initiate a transaction (for example, make a purchase or submit a loan application), and a validation controller 320 that includes a transaction displayer 322 (configured to control the display on user interface 304 of user device 108 of transactions by other users awaiting or queued for validation) and a validation initiator 324 (configured to be controlled by the user of user device 108 to select and initiate the validation of transactions displayed by transaction displayer 322 as awaiting or queued for validation). Processor 308 also includes a blockchain controller 326 configured to add events to a blockchain on blockchain network 102.

Memory 310 includes program code 330 for implementing the functions of processor 308, a cryptographic key store 332 (for storing the cryptographic keys required to access blockchains in blockchain network 102 to which user device 108 requires access to perform its functions as described herein), a blockchain store 334 and a settings store 336.

Membership application initiator is controllable by a user of user device 108 to initiate a membership application, that is, to submit a membership application to blockchain network 102, where the application will be detected by membership manager 214 of validation server 106, as described above.

Transaction initiator 316 is controllable by a member using user device 108 to initiate a transaction with vendor server 104 (e.g. to purchase a product, apply for a loan or purchase services). When the member controls transaction initiator 316 to initiate a transaction, transaction initiator 316 responds by adding that transaction to a block in a blockchain in blockchain network 102, thereby broadcasting the transaction to the other members. The transaction requires validation by another member of the network (who cannot be the initiating member), so the submission of the transaction is detected by VPP incrementor 220 (described above) and by user prioritizer and assigner 226, which respond as described above.

Transaction displayer 322 of validation controller 320 is configured to control the displaying on user interface 304 of transactions by other users awaiting or queued for validation, and validation initiator 322 is configured to be controlled by the user of user device 108 to select and initiate the validation of transactions (that is, by hashing the transaction into a block) displayed by transaction displayer 320 as awaiting or queued for validation. In this embodiment, transaction displayer 322 of each member's user device 108 constructs and displays a queue of all pending transactions. Hence, all members see all of the transactions and may attempt to validate any of the transactions (other than their own), with the member whose validation is accepted or effected determined according to priority. A member attempts to validate a transaction by controlling validation initiator 324 (which may be in the form of a touch-screen controller) to select and initiate validation of any of the queued and displayed transactions.

Validation controller 320 then responds by controlling blockchain controller 326 to initiate validation of the selected transaction in blockchain network 102 unless another member or other member(s) have validly already done so (having, for example, reacted faster or having a faster network connection). Validation of a transaction entails validation controller 320 processing and hashing one or more transactions into a valid block that is then made ready to be subsequently added to the blockchain by each of the peers (in blockchain network 102) of user device 108— that is, each peer updates its own copy of the blockchain. The new block contains the transaction(s) to be recorded, without which the transaction cannot be completed. (It should be appreciated that the validating member(s)—or validator(s) for the instant transaction—are not, by validating the transaction, confirming any of the transaction's details: he, she or they are merely facilitating the addition of the new block to the blockchain. Other elements of transaction validation—such as member identity—are facilitated by other mechanisms, such as smart contracts.)

The members thus compete for validations. The validators accumulate as many transaction validations as can be accommodated into a block, and go through a cryptographical verification process to prove the validity of the block (i.e. all transactions in the block) and add it to the chain of previous blocks in blockchain network 102. Whichever member or members validate the transaction is also recorded in the blockchain in blockchain network 102 as having done so and has his or her (or their) VPP incremented: that is, VPP determiner 216 responds to the validation by updating each validator's VPP and VPP register 234 accordingly. The VPP incrementation (or 'reward') may be distributed among a plurality of validators (that is, the members of a validating user pool that perform validation of a specific transaction), with that distribution being made according to the respective members' VPP and/or VEP.

Figure 4:
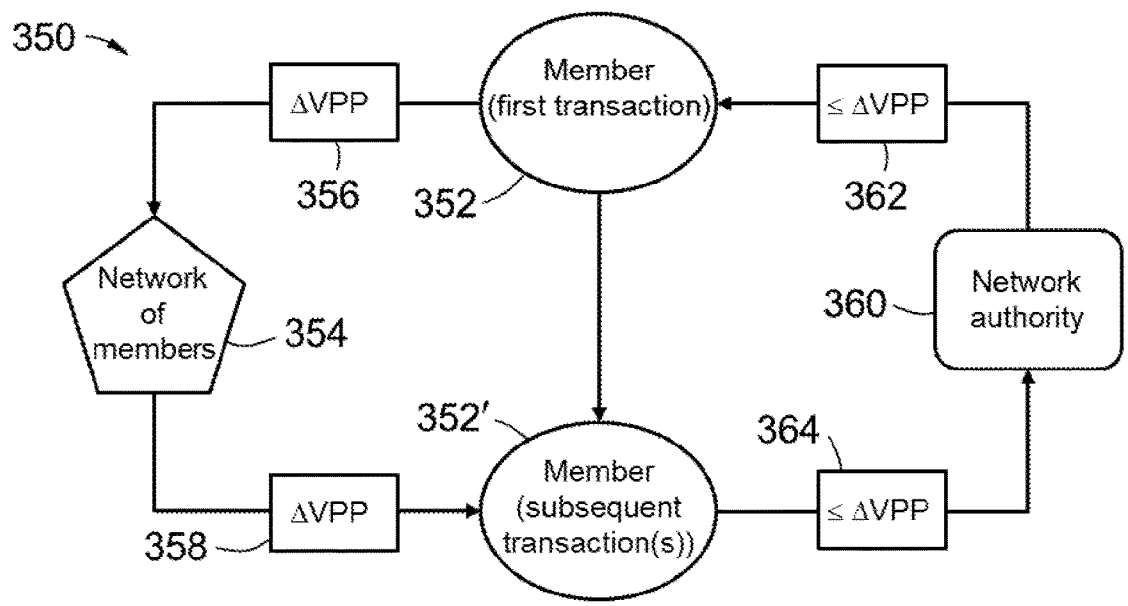
FIG. 4 is a simplified schematic representation of the flow of transactions (e.g. loans) for receiving transaction validation, for the case of a new member, in the transaction validation system of FIG. 1.

FIG. 4 is a simplified schematic representation 350 of the increment and decrement of respective validation performance parameters, in the case of a new member. Typically a new member 352 may be expected to have a validation performance parameter (VPP) of zero when initiating his or her first transaction (e.g. making a purchase, taking out a loan, purchasing cryptocurrency, accepting a digital voucher or taking out a smart loan). Hence, in that scenario, when that member's first transaction is validated (by N existing members), the member's validation performance parameter becomes negative, being decremented from its initial value (VPP=zero) by $\Delta$VPP. Recall that, for new members, the VEP for new members may not be immediately calculated. Instead, a rationing rule can be used to allow new members to compete, as discussed above.

The value of $\Delta$VPP is fixed in some implementations; that is, validation causes the VPP of the transacting member and the VPP of the validating member(s) to be decremented (by $\Delta$VPP) and incremented (by $\Delta$VPP/N), respectively, by the same amounts for all transactions. In some other implementations, $\Delta$VPP has a value that is determined dynamically. In one example, $\Delta$VPP has a value that depends on the value and/or nature of the transaction. For example, in transactions worth up to $x, $\Delta$VPP may be a first value (e.g. 10), while in transactions worth more than $x (and possibly as high as some multiple of $x), $\Delta$VPP may be a second value (e.g. 15), etc. However, in the simple example of FIG. 4, the increment $\Delta$VPP and the total decrement (=N x $\Delta$VPP/N) upon having a transaction validated are assumed to be identical to each other and identical for all transactions.

Returning to FIG. 4, one or more of the other members of the network 354, having performed the transaction validation, has his, her or their validation performance parameter incremented by the same total amount, $\Delta$VPP. Hence, there is a notional flow 356 in the validation performance parameter of $\Delta$VPP from the new member 352 to the validating member(s) of network 354. Likewise, when a member of network 354 (other than new member 352) initiates a transaction, member 352' (formerly new member 352) may validate that transaction (possibly in conjunction with other members). The VPP of the member initiating the transaction is decremented by the standard amount, and the VPP of member 352' (and the VPP of any other validating members) is incremented by the standard amount, $\Delta$VPP/N. Again, there is a notional flow 358 in the VPP of $\Delta$VPP from the member of network 354 to the validating members, including member 352'. By this mechanism, member 352' can achieve—in due course—a VPP of zero and, with repeated validations, greater than zero—which, along with the promptness with which member 352' performs such validations—has implications for his or her access to further transaction validation opportunities.

In a variation of this embodiment, members are not authorized to make transactions if doing so would give them a negative VPP. This constraint is enforced by system 100 to further ensure that members participate in the validation of transactions if they wish to make transactions. Thus, in this variation, a member in this position (such as new member 352) may first validate one or more transactions and thereby secure a VPP of sufficient positive magnitude to make his or her own transaction. Alternatively, this variation permits the member to have his or her VPP increased by a network authority 360 (which administers validation server 106) to a value sufficient to make his or her own transaction without his or her VPP becoming negative.

In this latter scenario of this variation, when validation server 106 detects that a member has initiated a transaction and that that member has an insufficient VPP to ensure it remains non-negative, validation server 106 increments the VPP of that member to be sufficiently great that, when the transaction of that member is validated (by another member), the VPP of the member remains non-negative. This may be done, for example, by increasing the member's VPP to the value $\Delta$VPP that will be decremented at validation (such that after validation the member will have a VPP equal to zero) or by increasing the member's VPP by the value $\Delta$VPP to be decremented at validation (such that after validation the member will have a VPP such that $0 < VPP < \Delta VPP$, depending on the previous value of the member's VPP). There is thus a notional flow 362 in the VPP of $\leq \Delta$VPP from network authority 360 to new member 352 (though it should be noted that network authority 360 need not maintain a constant sum of validation performance parameters—$\Sigma_i$ $VPP_i$ for members i—across network 354).

However, network authority 360 then initiates a decrement in the VPP of member 352' (formerly new member 352) equal to the amount by which the VPP was incremented as soon as it detects that the VPP of member 352' reaches a value greater than or equal to the amount by which the VPP was incremented, resulting in a notional flow 364 in the VPP of $\Delta$VPP from member 352' to network authority 360. This mechanism can be repeated as often as desired, though members may be constrained from exploiting it under certain circumstances (such as without validating another member's transaction between taking advantage of this mechanism, or more than a predefined number of times in a predefined period).

Figure 5:
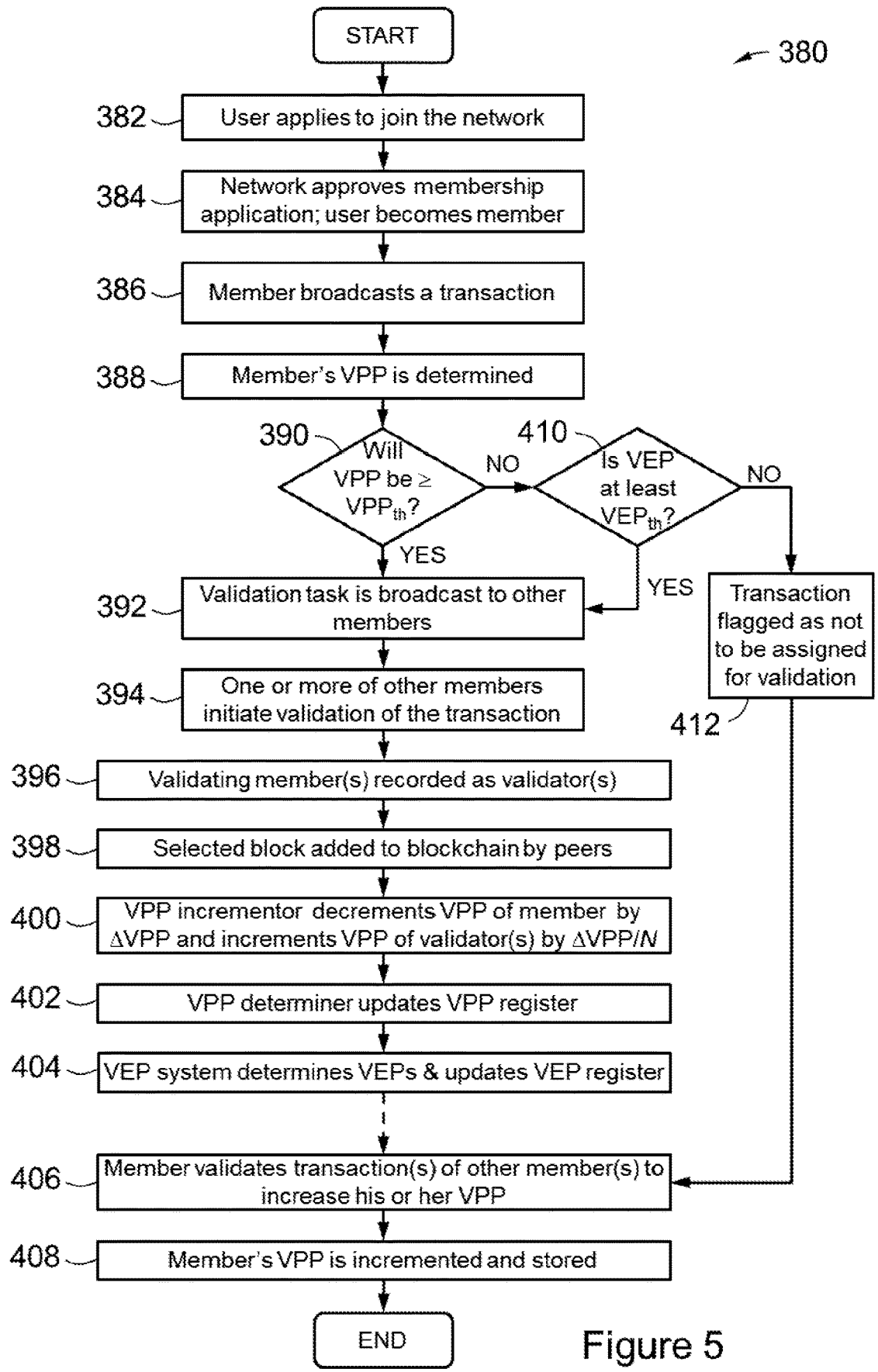
FIG. 5 is a flow diagram of the proof of use validation method implemented by the transaction validation system of FIG. 1.

FIG. 5 is a flow diagram 380 of the proof of use validation method implemented by system 10. Referring to FIG. 5, at step 382 a user applies to join the network and, at step 384, the network approves the membership application such that the user becomes a member. At this point, the new member has a VPP=0. At step 386, the new member broadcasts a transaction on blockchain network 102 (the transaction comprising, in this example, an application for a loan to be ultimately submitted to vendor server 104 of a financial institution) and, at step 388, the member's VPP is determined (in this scenario being equal to zero). At step 390, VPP determiner 216 determines whether the new member's VPP will be greater than or equal to the threshold VPP after validation of the new member's transaction; if so, processing continues at step 392, where the validation task corresponding to the transaction is broadcast to one or more of the other members. At step 394, one or more of those members to whom the transaction was broadcast initiate validation of the transaction.

At step 396, one or more (=N) validations of the transaction (i.e. hashing the transaction into a valid block and made ready to be added to the blockchain) are initiated by validating members. In one variation, if more than one member initiates validation, the system permits only those of the N highest priorities or speed to actually effect validation and be recorded as such in blockchain network 102. It will be appreciated by those in the art that, in some situations in which more than one validation is performed (especially by a plurality of members of equal priority), a blockchain fork may arise; these may be handled by any suitable technique, such as by deeming the longer of the resulting chains as the correct chain. It should also be appreciated that the 'winning' validator(s) may be determined somewhat later, once—for example—the blockchain fork has been resolved. More generally, the selection of the validator may occur prior to, simultaneously with, or after the transaction(s) are hashed into a valid block.

At step 398, the selected block (i.e. into which the hashed transaction has been added) is added to the blockchain by the peers (i.e. each peer updates its own copy of the blockchain ledger to include the selected block) and, at step 400, VPP incrementor 220 decrements the VPP of the transaction initiating member by $\Delta$VPP and increments the VPP of each of the validator(s) by, in this embodiment, $\Delta$VPP/N. At step 402, VPP determiner 216 determines the VPP of the member and of the validator(s) and updates VPP register 234 accordingly. A step 404, VEP system 218 determines the VEP of the member initiating the transaction and of the validator(s), and records the new VEPs in VEP register 236.

At some later time, at step 406, the member validates one or more other members' transactions to increase the member's VPP, which subsequently prompts, at step 408, VPP incrementor 220 to increment the VPP of the member and store the new VPP in VPP register 234. In the variation described above by reference to 360, 362 and 364 of FIG. 4, if—after step 408—VPP determiner 216 determines that the VPP of the member is at least the amount by which VPP incrementor 220 increased that member's VPP, VPP incrementor 220 responds by decreasing the VPP of the member by that amount.

Processing then ends (or may return to step 406).

If, at step 390, VPP determiner 216 determines that the new member's VPP will be less than the threshold VPP after validation of the new member's transaction, processing continues at step 410 where user prioritizer and assigner 226 determines whether the VEP of the member is at least the threshold VEP. If so, processing continues at step 392 (as described above); if not, processing continues at step 412 where user prioritizer and assigner 226 flags the transaction as not to be assigned to other members for validation, and indeed refrains from doing so. Processing continues at step 406 where, at some later time, the member has the opportunity to increase his or her VPP and/or VEP.

Thus, although in this embodiment blockchain network 102 is a permissioned network such that only eligible members are admitted as users, validation of transactions is performed in a decentralized manner with a consensus mechanism based on reciprocity, referred to as proof of use (PoU). As has been seen, a member can have a transaction validated by another member and, for that service, suffers a reduction in VPP; the member reciprocates by validating the transactions of other members, so increased his or her VPP. In one variation described above, obtaining validation is facilitated, where necessary, by increasing the VPP of the member seeking validation, so that the VPP of that member will remain at or above zero; that process is reversed when the member regains a sufficiently high VPP by validating others' transactions.

System 100 may include various optional features. For example, a member with a high VPP (e.g. owing to performing many more validations than transactions) may convert some or all of the VPP into cryptocurrency—such that system 100 can include one of the advantages of PoW.

In some embodiments, system 100 is configured to reduce the possibility that a single validating member can dominate validation, that is, has a monopoly over the validation process—which would undermine the consensus principle on which system 100 operates. Such domination might arise if a member with a high VPP were permitted to purchase the 'right to validate' of other members using the surplus. System 100 may thus be configured such that the total amount of a member's VPP that can be treated as negotiable over a predefined period (e.g. 14 days) cannot exceed a predefined amount or predefined percentage (e.g. 10%) of that member's VPP. A transaction that would violate this rule can be prevented by configuring user prioritizer and assigner 226 not to assign such a transaction to any members for validation. Alternatively, user prioritizer and assigner 226 may be configured to permit validation of a transaction that would otherwise violate this rule, but configured so that the member that has his or her VPP incremented in the transaction (viz. not through the validation of the transaction) is treated as not possessing that increment in VPP for the purposes of validating others' transactions.

Overall, system 100 is designed to give incentive to members to offer reciprocal validation services in order to support the sustainability of the system. Participation is based in part on priority, which members build over time as they validate transactions and have their transaction validated.

As a cooperative mechanism, proof of use helps to economize on energy (as it does not constitute a conventional 'proof of work' technique), while giving members a sufficient stake to participate in validation. Members have an incentive to compete to obtain a higher priority. Nonetheless, the priority criteria controls competition within reasonable bounds.

Computer System Architecture

It should be further appreciated that, in the embodiments described above, computing devices 104, 106 and/or 108 may—in various variations thereof—be implemented using hardware, software, firmware, non-transitory computer readable media having instructions stored thereon, or a combination thereof and may be implemented in one or more computer systems or other processing systems. Hardware, software, or any combination thereof may embody modules and components used to implement the methods as described in this present application.

When programmable logic is used, that logic may execute on a commercially available processing platform configured by executable software code to become a specific purpose computer or a special purpose device (e.g., programmable logic array, application-specific integrated circuit, etc.). A person having ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor device and a memory may be used to implement the computing devices of the embodiments above described.

A processor as discussed herein may be a single processor, a plurality of processors, or combinations thereof. Processors may have one or more processor "cores." The terms "computer program medium," "computer readable medium," "non-transitory computer readable medium," and "computer usable medium" as discussed herein are used to generally refer to tangible media.

Various embodiments of the present invention are described in the illustrated examples. After reading this description, it will be apparent to a person skilled in the relevant art how to implement the present application using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

The processors 208, 308 may be special purpose or general purpose processors specifically configured to perform the functions discussed herein. They may be operably connected to an external telecommunications network via respective communication controllers, in turn connected to transmitters and receivers. The telecommunications network may be any network suitable for performing the functions as disclosed herein and may comprise a local area network (LAN), a wide area network (WAN), a wireless network (e.g., WiFi), a mobile communication network, a satellite network, the Internet, fiber optic, coaxial cable, infrared, radio frequency (RF), or any combination thereof. Other suitable network types and configurations will be apparent to persons having skill in the relevant art. Exemplary transmitters and receivers include a modem, a network interface (e.g., an Ethernet card), a communications port, a PCMCIA slot and card, etc.

Software and data transferred via transmitters and receivers may be in the form of signals, which may be electronic, electromagnetic, optical, or other signals as will be apparent to persons having skill in the relevant art. The signals may travel via a communications path, which may be configured to carry the signals and may be implemented using wire, cable, fibre optics, a phone line, a cellular phone link, a radio frequency link, etc.

Memory 210 and 310 (e.g., random access memory, read-only memory, etc.), and may also include or be accompanied by storage comprising a hard disk drive and a removable storage drive, such as a floppy disk drive, a magnetic tape drive, an optical disk drive, a flash memory, etc. In some embodiments, this storage includes alternative means for allowing computer programs or other instructions to be loaded into the computing devices 104, 106 and/or 108, such as a removable storage drive and an interface. Examples of such means may include a program cartridge and cartridge interface (e.g., as found in video game systems), a removable memory chip (e.g., EEPROM, PROM, etc.) and associated socket, and other removable storage units and interfaces as will be apparent to persons having skill in the relevant art.

Data stored in computing devices 104, 106 and/or 108 may be stored on any type of suitable computer readable media, such as optical storage (e.g., a compact disc, digital versatile disc, Blu-ray disc, etc.) or magnetic tape storage (e.g., a hard disk drive). The data may be configured in any type of suitable database configuration, such as a relational database, a structured query language (SQL) database, a distributed database, an object database, etc. Suitable configurations and storage types will be apparent to persons having skill in the relevant art.

Computing devices 106 and/or 108 may further include output devices, configured to allow data to be transferred between the respective device and user interfaces 204, 304. Such an output device comprises, for example, a high-definition multimedia interface (HDMI), digital visual interface (DVI), video graphics array (VGA), etc. User interfaces 204, 304 may include any suitable type of display for displaying data transmitted via the output device, such as a cathode ray tube (CRT) display, liquid crystal display (LCD), light-emitting diode (LED) display, capacitive touch display, thin-film transistor (TFT) display, etc.

User interfaces 204, 304 also comprise input devices such as touch panels, keyboards, mice, joysticks, digital cameras and microphones. Audio input devices (such as the microphones as mentioned) may be used for purposes including speech recognition. Image input devices (such as the digital cameras as mentioned) may be used for purposes including gesture recognition.

Computer program code and computer readable medium may refer to memories, such as memory 210, 310, which may be memory semiconductors (e.g., DRAMs, etc.). These computer program code 230, 330 provide software to the respective computing devices 106, 108. Such computer program code, when executed, controls devices 106, 108 to implement at least in part, the methods discussed herein.

Processors 208, 308, as described above, comprise modules or engines configured to perform the functions of computing devices 106, 108 respectively. Each of the modules or engines may be implemented using hardware and, in some instances, may also utilise software, such as corresponding to program code stored in memory 210, 310, respectively. In such instances, program code may be compiled by processors 208, 308 (e.g., by a compiling module or engine) prior to execution by the hardware of computing devices 106, 108. For example, the program code 230, 330 may be source code written in a programming language that is translated into a lower level language, such as assembly language or machine code, for execution by processors 208, 308 and/or any additional hardware components of devices 106, 108. The process of compiling may include the use of lexical analysis, preprocessing, parsing, semantic analysis, syntax-directed translation, code generation, code optimization, and any other techniques that may be suitable for translation of program code into a lower level language suitable for controlling devices 106, 108 to perform the functions disclosed herein. It will be apparent to persons having skill in the relevant art that such processes result in devices 106, 108 being one or more specially configured computer systems uniquely programmed to perform the functions discussed above.

It will be understood to persons skilled in the art of the invention that many modifications may be made without departing from the spirit and scope of the invention, in particular it will be apparent that certain features of embodiments of the invention can be employed to form further embodiments.

It is to be understood that, if any prior art is referred to herein, such reference does not constitute an admission that the prior art forms a part of the common general knowledge in the art in any country.

The invention claimed is:

1. A method for use in a distributed computing system, the method comprising:

registering, via a server, a plurality of user devices that are authorized to initiate a transaction and validate the transaction, making it visible to the distributed computing system;

assigning, by the server, to each user device of the plurality of user devices a unique cryptographic identifier to establish a secure communication channel using an end-to-end encryption based on the respective cryptographic identifier between each said user device of user devices and the server;

storing, in a distributed ledger, a user profile for each said user device of the plurality of user devices indexed by its respective unique cryptographic identifier and comprising metadata related to transaction initiation, validation history, and a dynamic validation performance parameter (VPP) value, wherein the distributed ledger provides an immutable record of changes in VPP for auditability;

determining, via the server, the VPP of each user device by calculating the ratio of a number of initiated transactions to validated transactions performed by each said user device of the plurality of user devices using real-time data retrieved from the distributed ledger;

applying, via the server, a predefined mathematical model that penalizes frequent initiation of transactions while rewarding successful validations, wherein the VPP calculation incorporates weights for transaction complexity and validation accuracy;

in response to detecting, by the server, the first transaction initiation by a first user device of the plurality of user device received via the respective secure communication channel, comparing, the calculated VPP of the first user device to a dynamically adjustable VPP threshold; wherein the VPP threshold is determined using an adaptive machine learning algorithm based on historical network performance and validation accuracy metrics;

assigning, via the server, the first transaction to at least a second user device of the plurality of user devices and a third user device of the plurality of user devices via the respective secure communication channels for validation based on their respective calculated VPPs, wherein devices with higher VPP values are prioritized for validation tasks requiring greater computational resources or cryptographic complexity and devices with lower VPP values are allocated simpler validation tasks to incentivize performance improvement;

responsive to receiving a first validation result from the second user device of the plurality of user devices and a second validation result from the third user device of the plurality of user devices, verifying, via the server, the received first and second validation results using cryptographic signatures generated using the respective unique cryptographic identifiers appended to the respective first and second validation results to ensure authenticity and integrity;

prioritizing, via the server, the first validation result using a weighted confidence scoring mechanism that factors in the lower VPP of the second user device of the plurality of user devices;

responsive to failing to verify the second validation result, discard, via the server, the second validation result;

recording, via the server, the first validation result in a blockchain network by hashing the validated transaction into a valid block of the blockchain network, wherein the hashing process uses a secure cryptographic hash function enhanced with salting or multi-round hashing to increase security and resistance to attacks; wherein the valid block includes metadata identifying the contributing validators and the associated VPP adjustments, and store the discarded second validation result in an auxiliary ledger;

decrementing, via the server, the calculated first VPP of the first user device of the plurality of user devices by a value proportional to the computational effort required to process the initiated transaction;

incrementing, via the server, the calculated second VPP of the second user device of the plurality of user devices based on the successful completion of the validation task and its contribution to the blockchain;

incorporating, via the server, cryptocurrency-based rewards for validators, distributed based on exchange rates determined by (i) real-time market rates, (ii) predefined thresholds, or (iii) average historical rates;

periodic recalibrating, via the server, VPP thresholds using predictive analytics to maintain a balanced workload across the distributed computing system; and implementing, via the server, a load-balancing algorithm that dynamically reassigns transactions to underutilized devices, minimizing latency while ensuring validation integrity, wherein the reassignment process is authenticated using the respective unique cryptographic identifiers of the user devices.

2. The method as claimed in claim 1, wherein the first amount and second amount are (i) predefined values stored in a secure database, or (ii) determined according to at least one characteristic of the first transaction, such as priority, complexity, or metadata, wherein the hashing process incorporates transaction-specific metadata or characteristics to enhance security, or (iii) determined according to a size of the first transaction and/or a nature of the first transaction, including its type and resource requirements.

3. The method as claimed in claim 1, wherein the first amount has a predefined or dynamic relationship to the second amount, determined by mathematical ratios, machine learning models, or transaction factors like size or urgency.

4. The method as claimed in claim 3, wherein the first amount is greater than the second amount.

5. The method as claimed in claim 1, comprising broadcasting the first transaction on the distributed computing system, wherein the transaction is encrypted for security, includes metadata for traceability, and is propagated using an efficient protocol to minimize latency, ensuring that the first transaction is visible to the respective user devices.

6. The method as claimed in claim 1, wherein the VPP threshold is expressed in the form of cryptocurrency and periodically recalibrated to align with network performance and validator rewards.

7. The method as claimed in claim 1, comprising converting the first VPP into crypto-or other currency, wherein the conversion process ensures secure execution, incorporates transaction-specific metadata for traceability, and dynamically aligns with the current exchange rate mechanism to optimize value.

8. The method as claimed in claim 1 wherein the first amount is equal to the second amount, determined by predefined rules, cryptographic validation, and recorded in the ledger for traceability.

9. A non-transitory computer-readable medium, storing computer program code, when executed by a computer, causes the computer to perform the method of claim 1, wherein the code ensures secure execution through cryptographic checks, optimizes processing via parallel computing, and logs operations in tamper-resistant audit record.

10. The method as claimed in claim 1, further comprising:
responsive to the second user device initiating a second transaction and the second VPP as incremented being below the VPP threshold, determine, via the server, a validation equilibration parameter (VEP) of the second user device, wherein the VEP is calculated using a weighted algorithm that considers the rate of change in the second VPP over a predefined time period, transaction complexity, and resource usage associated with the second user device; and
comparing, via the server, the VEP with a dynamically adjustable VEP threshold, where the threshold adapts to network conditions, transaction volume, and validators performance metrics to ensure fairness and system optimization.

11. The method as claimed in claim 10, further comprising:
responsive to the VEP being great than the dynamically adjustable VEP threshold, indicative of a sufficient increment of the second VPP, assign, via the server, at least one other user devices of the plurality of the user devices to validate the second transaction, wherein the server ensures secure task allocation using cryptographic protocols to maintain data integrity and confidentiality during the assignment process.

12. The method as claimed in claim 10, further comprising:
responsive to the VEP being less than the dynamically adjustable VEP threshold, indicative of an insufficient increment or a decrement of the second VPP, decline, via the server, to validate the second transaction.

13. A non-transitory computer readable medium comprising instructions, when executed by one or more processors of a server, cause the server to:
register a plurality of user devices that are authorized to initiate a transaction and validate the transaction, making it visible to the distributed computing system;
assign to each user device of the plurality of user devices a unique cryptographic identifier to establish a secure communication channel using an end-to-end encryption based on the respective cryptographic identifier between each said user device of user devices and the server;
store, in a distributed ledger, a user profile for each said user device of the plurality of user devices comprising metadata related to transaction initiation, validation history, and a dynamic validation performance parameter (VPP) value, wherein the distributed ledger provides an immutable record of changes in VPP for auditability;
determine the VPP of each user device by calculating the ratio of a number of initiated transactions to validated transactions performed by each said user device of the plurality of user devices using real-time data retrieved from the distributed ledger;
apply a predefined mathematical model that penalizes frequent initiation of transactions while rewarding successful validations, wherein the VPP calculation incorporates weights for transaction complexity and validation accuracy;
in response to detecting the first transaction initiation by a first user device of the plurality of user device received via the respective secure communication channel, comparing, the calculated VPP of the first user device to a dynamically adjustable VPP threshold; wherein the VPP threshold is determined using an adaptive machine learning algorithm based on historical network performance and validation accuracy metrics;
assign the first transaction to at least a second user device of the plurality of user devices and a third user device of the plurality of user devices via the respective secure communication channels for validation based on their respective calculated VPPs, wherein devices with higher VPP values are prioritized for validation tasks requiring greater computational resources or cryptographic complexity and devices with lower VPP values are allocated simpler validation tasks to incentivize performance improvement;
responsive to receiving a first validation result from the second user device of the plurality of user devices and a second validation result from the third user device of the plurality of user devices, verify the received first and second validation results using cryptographic signatures generated using the respective unique cryptographic identifiers appended to the respective first and second validation results to ensure authenticity and integrity;
prioritize the first validation result using a weighted confidence scoring mechanism that factors in the lower VPP of the second user device of the plurality of user devices;
responsive to failing to verify the second validation result, discard the second validation result;
record the first validation result in a blockchain network by hashing the validated transaction into a valid block of the blockchain network, wherein the hashing process uses a secure cryptographic hash function enhanced with salting or multi-round hashing to increase security and resistance to attacks; wherein the valid block includes metadata identifying the contributing validators and the associated VPP adjustments, and store the discarded second validation result in an auxiliary ledger;
decrementing the calculated first VPP of the first user device of the plurality of user devices by a value proportional to the computational effort required to process the initiated transaction;
increment the calculated second VPP of the second user device of the plurality of user devices based on the successful completion of the validation task and its contribution to the blockchain;
incorporate cryptocurrency-based rewards for validators, distributed based on exchange rates determined by (i) real-time market rates, (ii) predefined thresholds, or (iii) average historical rates;
periodic recalibrate VPP thresholds using predictive analytics to maintain a balanced workload across the distributed computing system; and
implement a load-balancing algorithm that dynamically reassigns transactions to underutilized devices, minimizing latency while ensuring validation integrity.

* * * * *